(12) United States Patent
Haag et al.

(10) Patent No.: US 10,838,127 B2
(45) Date of Patent: Nov. 17, 2020

(54) ABSORBING, REFLECTING AND COLLIMATING POLARIZER STACK AND BACKLIGHTS INCORPORATING SAME

(71) Applicant: 3M INNOVATIVE PROPERTIES COMPANY, St. Paul, MN (US)

(72) Inventors: Adam D. Haag, Woodbury, MN (US); Timothy J. Nevitt, Red Wing, MN (US); Michael F. Weber, Shoreview, MN (US); Robert D. Taylor, Stacy, MN (US); Carl A. Stover, St. Paul, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 414 days.

(21) Appl. No.: 14/769,302

(22) PCT Filed: Feb. 10, 2014

(86) PCT No.: PCT/US2014/015556
§ 371 (c)(1),
(2) Date: Aug. 20, 2015

(87) PCT Pub. No.: WO2014/130283
PCT Pub. Date: Aug. 28, 2014

(65) Prior Publication Data
US 2015/0378077 A1     Dec. 31, 2015

Related U.S. Application Data

(60) Provisional application No. 61/766,933, filed on Feb. 20, 2013.

(51) Int. Cl.
*G02B 5/30* (2006.01)

(52) U.S. Cl.
CPC ......... *G02B 5/3041* (2013.01); *G02B 5/3083* (2013.01)

(58) Field of Classification Search
CPC ........ G02B 1/08; G02B 5/0841; G02B 5/287; G02B 5/30; G02B 5/3008; G02B 5/3016;
(Continued)

(56) References Cited

U.S. PATENT DOCUMENTS 4,659,523 A    4/1987   Rogers
4,895,769 A    1/1990   Land
(Continued)

FOREIGN PATENT DOCUMENTS

EP        1498770 A1      1/2005
JP     2008-040251 A      2/2008
(Continued)

OTHER PUBLICATIONS

Lazarev, "Low-leakage off-angle in E-polarizers", Journal of the SID, 2001, vol. 9, No. 2, pp. 101-105.
(Continued)

*Primary Examiner* — Nicholas R. Pasko
*Assistant Examiner* — Ibrahima Diedhiou
(74) *Attorney, Agent, or Firm* — Robert S. Moshrefzadeh

(57) ABSTRACT

Polarizer stacks are described. More particularly, polarizer stacks that include an absorbing polarizer and multiple reflective polarizers, including at least one collimating reflective polarizer are described. Such polarizer stacks are capable of emitted light that is both collimated and color neutral. Backlights incorporating such polarizer stacks are also described.

7 Claims, 18 Drawing Sheets

(58) Field of Classification Search
CPC .... G02B 5/3025; G02B 5/305; G02B 5/3033; G02B 5/3041; G02B 5/3066; G02B 5/3083; G02B 6/0051; G02B 6/0053; G02B 6/0055; G02B 6/0056; G02B 6/0068; G02B 6/0073; G02B 6/0096; G02B 27/142; G02B 27/26; G02B 27/281; G02B 27/283; G02B 27/286; G02F 1/133528; G02F 1/133533; G02F 1/133536; G02F 1/133545; G02F 1/133603; G02F 1/133605; G02F 1/133606; G02F 1/13362; G02F 1/13363; G02F 1/133634; G02F 2001/133541; G02F 2001/133543; G02F 2001/133545; G02F 2001/133607; G02F 2001/133638; F21V 7/04; F21V 13/08; B29C 55/023; B32B 2307/40; B32B 2307/518; B29K 2995/003; B29K 2995/0034; B29D 7/01; B29D 11/00788; B29L 2009/00; H04N 13/0434; H04N 13/0438
USPC .... 359/352, 483.01, 485.01, 485.02, 485.03, 359/485.04, 487.01, 487.02, 487.05, 359/487.06, 489.01, 489.06, 489.07, 359/489.12, 489.13, 493.01, 5, 580, 586, 359/589; 362/19, 97.1, 97.2, 612, 613, 362/96, 112, 194, 561, 611
See application file for complete search history.

(56) References Cited

U.S. PATENT DOCUMENTS

| | | |
|---|---|---|
| 5,808,794 A | 9/1998 | Weber |
| 5,882,774 A | 3/1999 | Jonza |
| 6,096,375 A | 8/2000 | Ouderkirk |
| 6,179,948 B1 | 1/2001 | Merrill |
| 6,498,683 B2 | 12/2002 | Condo |
| 6,697,195 B2 | 2/2004 | Weber |
| 7,826,009 B2 | 11/2010 | Weber |
| 2008/0151371 A1 | 6/2008 | Weber |
| 2010/0156953 A1 | 6/2010 | Nevitt |
| 2010/0165660 A1 | 7/2010 | Weber |
| 2011/0272849 A1 | 11/2011 | Neavin |
| 2011/0279997 A1 | 11/2011 | Weber |
| 2012/0275023 A1 | 11/2012 | Weber |

FOREIGN PATENT DOCUMENTS

| | | |
|---|---|---|
| TW | 200745674 A | 12/2007 |
| WO | WO 1995-17691 | 6/1995 |
| WO | WO 2008-144636 | 11/2008 |
| WO | WO 2008-144656 | 11/2008 |
| WO | WO 2011/050233 A1 | 4/2011 |
| WO | WO 2013-059226 | 4/2013 |
| WO | WO 2013-059228 | 4/2013 |

OTHER PUBLICATIONS

International Search Report for International PCT Application No. PCT/US2014/015556 dated Jun. 23, 2014, 3 pages.

ABSORBING, REFLECTING AND COLLIMATING POLARIZER STACK AND BACKLIGHTS INCORPORATING SAME

FIELD

The present description relates to polarizer stacks. More particularly, the present description relates to polarizer stacks that include both reflective and absorbing polarizers, and provide light output that is collimated and color neutral. Additionally backlights that incorporate such polarizer stacks are described.

BACKGROUND

Display devices, such as liquid crystal display (LCD) devices, are used in a variety of applications including, for example, televisions, hand-held devices, digital still cameras, video cameras, and computer monitors. Because an LCD panel is not self-illuminating, some display applications may require a backlighting assembly or a "backlight." A backlight typically couples light from one or more sources (e.g., a cold cathode fluorescent tube (CCFT) or light emitting diodes (LEDs)) to the LCD panel. Common display devices usually include polarizers.

Reflective polarizers are known. Often times, reflective polarizers may be made up of multilayer optical films that incorporate a large number of thin layers of different light transmissive materials, often referred to as microlayers because they are thin enough so that the reflection and transmission characteristics of the optical film are determined in large part by constructive and destructive interference of light reflected from the layer interfaces. In such reflective polarizers, a plurality of microlayers' in-plane refractive indices are selected to provide a substantial refractive index mismatch between adjacent microlayers along an in-plane block axis and a substantial refractive index match between adjacent microlayers along an inplane pass axis. Such films are described in, e.g., U.S. Pat. No. 5,882,774 (Jonza et al.). Such reflective polarizers have a sufficient number of layers to ensure high reflectivity for normally incident light polarized along the block axis, while maintaining low reflectivity and high transmission for normally incident light polarized along the pass axis.

In some display applications, a reflective polarizer may be combined with, e.g. an absorbing polarizer. Such constructions are described in, e.g., U.S. Pat. No. 6,096,375 to Ouderkirk et. al., U.S. Pat. No. 6,697,195 to Weber et. al. and U.S. Pat. No. 7,826,009 to Weber et al., each of which is hereby incorporated by reference in its entirety. Absorbing polarizers are made, for example, by incorporating a dye into a polymer sheet that is then stretched in one direction. Absorbing polarizers can also be made by uniaxially stretching a semicrystalline polymer such as polyvinyl alcohol, then staining the polymer with an iodine complex or dichroic dye, or by coating a polymer with an oriented dichroic dye. Many commercial polarizers typically use polyvinyl alcohol as the polymer matrix for the dye. Absorbing polarizers normally have a large amount of absorption of light (and may also in some literature be referred to as "dichroic polarizers"). The use of such "hybrid polarizers" (combining reflective and absorbing polarizers) can provide very good extinction if the extinction spectra of the layers are carefully designed.

Further, 3M Company has recently developed reflective polarizers that can combine light collimating functions generally provided by structured films, such as brightness enhancing prismatic or beaded films, while still providing the requisite reflective polarization function. Such reflective polarizers are described, e.g., in commonly owned and assigned International Application Nos. PCT/US2012/060485 and PCT/US2012/060483, each of which is hereby incorporated by reference in its entirety. The films described in these applications provide unique shapes of transmission spectra in order to balance reflected and transmitted color, and provide a neutral white display, while also collimating light generally towards a viewer. As a result of these spectral designs for neutral white backlight output color, the extinction state of light of the reflective polarizer often has a non-neutral color transmitting through the film that must then be neutralized by a separate high performance iodine absorbing polarizer element (prior to reaching the liquid crystal panel). Such a separate element has also been necessary as the block axis transmission levels of the reflective polarizer films have been too high to act as the only polarizing element immediately adjacent a liquid crystal panel, and even where the overall transmission level in the extinction state are generally low, there may be spikes in one area of the color spectrum.

There remains a need in the art for a singular film stack that acts as a polarizer and serves the properties of reflection, absorption and collimation, while also providing for color neutrality in both the pass and extinction states. The present description seeks to address this need.

SUMMARY

In one aspect, the present description relates to a polarizer stack. The polarizer stack includes a first birefringent reflective polarizer having pass and block axis transmission spectra, a collimating birefringent reflective polarizer having a block axis transmittance that decreases with increasing wavelength, and an absorbing polarizer layer positioned between the first birefringent reflective polarizer and collimating birefringent reflective polarizer. The pass axis transmission of the polarizer stack as a whole is substantially neutral across the visible wavelength band. The polarizer stack may also include a second absorbing polarizer layer positioned on the opposite side of the first birefringent polarizer from the absorbing polarizer layer.

In some embodiments, the block axis transmittance of the first birefringent polarizer increases as wavelength increases across the visible spectrum. In some embodiments, the pass axis transmittance of the collimating reflective polarizer is neutral or decreases as wavelength increases across the visible spectrum. In some embodiments, the polarizer stack satisfies: $T^{pass}60/T^{pass}0<0.75$ or $T^{pass}60/T^{pass}0<0.60$ for p-pol or potentially for s-pol light. Additionally, the $T^{pass}$ of visible light may be greater than 0.3, 0.4 or 0.5. Further the polarizer stack may satisfy $T^{block}0<10^{-3}$.

In some embodiments, the contrast ratio of the absorbing polarizer layer is 100:1 or less. In some, the contrast ratio of the polarizer stack is 6,000:1 or more. Additionally, the $R_{hemi}$ of first birefringent polarizer may be <0.50, and the $R_{hemi}$ of the collimating birefringent reflective polarizer may be at least 0.60.

In a different aspect, the present description relates to a backlight that includes a light source and the polarizer stack previously described. Additionally, the present description may relate to a backlight that includes a display and the backlight described.

In another aspect, the present description relates to a backlight. The backlight includes (1) a light recycling cavity, the light cavity comprising: a front reflector, a back reflector, a Pass Intensity Spectrum and a Block Intensity Spectrum, wherein the front reflector is partially reflective and includes an ARCP; and (2) one or more light source members disposed to emit light into the light recycling cavity. The Pass Intensity Spectrum and Block Intensity Spectrum are both substantially neutral across a visible wavelength band and have the ratio of at least 500:1 at normal incidence. In at least some embodiments, the ARCP includes a first birefringent reflective polarizer having pass and block axis transmission spectra, a collimating birefringent reflective polarizer having a block axis transmittance that decreases with increasing wavelength, and an absorbing polarizer layer positioned between the first birefringent reflective polarizer and collimating birefringent reflective polarizer.

In some embodiments the pass axis transmission of the ARCP is substantially neutral across the visible wavelength band. Additionally, the Pass Intensity Spectrum and Block Intensity Spectrum may both be substantially neutral across a visible wavelength band and have the ratio of at least 1,000:1 at normal incidence. Further, the ARCP may satisfy: $T^{pass}60/T^{pass}0<0.75$, or $T^{pass}60/T^{pass}0<0.60$ for p-pol or s-pol. light.

DETAILED DESCRIPTION

In the following detailed description, reference is made to the accompanying drawings that form a part hereof, and in which are shown by way of illustration several specific embodiments of devices, systems and methods. It is to be understood that other embodiments are contemplated and may be made without departing from the scope or spirit of the present disclosure. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure.

The present description provides for a polarizer stack that acts as an absorbing, reflective, and collimating polarizer. The polarizer stack can provide higher brightness than a conventional dichroic polarizer used with a liquid crystal backlight display and can also collimate light towards a normal-angle viewer while maintaining neutral color in both bright and dark states. The use of dichroic layers in the stack allow for neutral color with multilayer optical films that otherwise would have objectionable color. Such a polarizer stack is highly useful in displays including liquid crystal displays, touch screen displays, transflective displays, for phone, mobile, tablet, notebook, monitor and the like applications. The unique combination of functions noted in a singular stack allows for thinner, simpler and more efficient displays.

In another sense, the present description provides a solution to the problem of creating a polarizing element for use with a Liquid Crystal Display and associated backlight that provides a black dark or block state, and neutral white or pass state without the necessity of a conventional PVA Iodine polarizer used immediately adjacent to the LC panel.

Figure 1:
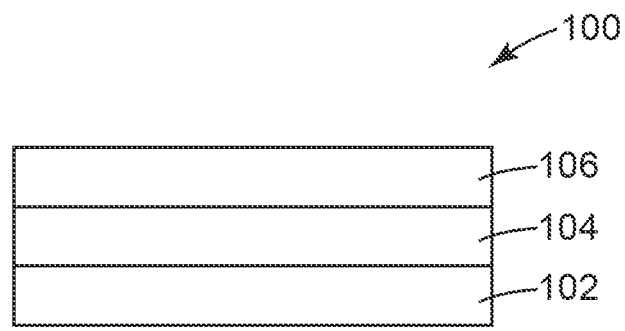
FIG. 1 is a cross-sectional view of a polarizer stack according to the present description.

Referring to FIG. 1, the polarizer stack 100 includes a first birefringent reflective polarizer 106, an absorbing polarizer 104 and a collimating birefringent reflective polarizer 102 that is positioned on the opposite side of the absorbing polarizer from first birefringent polarizer 106. As noted above, the present description provides for the collimation of light, and generally this is achieved through collimating birefringent reflective polarizer 102. The polarizer stack 100, simultaneously is absorbing, reflecting, collimating and polarizing, and is referred to below as either the polarizer stack or an absorbing, reflective, collimating polarizer ("ARCP"). The two terms should be understood to have the same meaning. The general function of collimating birefringent reflective polarizer may be better understood through the following description of collimating birefringent reflective polarizer 102.

In many embodiments, the collimating birefringent reflective polarizer has a reflectivity that generally increases with angle of incidence, and a transmission that generally decreases with angle of incidence, where the reflectivity and transmission are for unpolarized visible light and for any plane of incidence, and/or for light of a useable polarization state incident in a plane for which oblique light of the useable polarization state is p-polarized, for one plane of reference, and s-polarized for the orthogonal plane of reference. Further, the collimating birefringent reflective polarizer preferably has a high value of hemispheric reflectivity $R^f_{hemi}$, while also having a sufficiently high transmission of application-useable light.

In many embodiments, collimating birefringent reflective polarizers have a relatively high overall reflectivity to support relatively high recycling within a cavity or film stack. We characterize this in terms of "hemispheric reflectivity," meaning the total reflectivity of a component (whether a surface, film, or collection of films) when light (of a wavelength range of interest) is incident on it across a distribution of all possible directions. Thus, the component is illuminated with light incident from all directions (and all polarization states, unless otherwise specified) within a hemisphere centered about a normal direction, and all light reflected into that same hemisphere is collected. The ratio of the total flux of the reflected light to the total flux of the incident light for the wavelength range of interest yields the hemispheric reflectivity, $R_{hemi}$. Of particular note, $R_{hemi}$ is characterized at discrete wavelengths, and may be taken as an average-value across a range of wavelengths of interest. Further, unlike the reflectivity for normal incidence, $R_{hemi}$ is insensitive to, and already takes into account, the variability of reflectivity with incidence angle, which may be very significant for some components (e.g., prismatic films).

In fact, some embodiments of collimating birefringent reflective polarizers exhibit a (direction-specific) reflectivity that increases with incidence angle away from the normal (and a transmission that generally decreases with angle of incidence), at least for light incident in one plane. Such reflective properties cause the light to be preferentially transmitted from the cavity or stack in which the collimating polarizer resides, out through the collimating birefringent reflective polarizer at angles closer to the normal, i.e., closer to the viewing axis of the backlight, and this helps to increase the perceived brightness of the display at viewing angles that are important in the display industry (at the expense of lower perceived brightness at higher viewing angles, which are usually less important). This effect is termed collimation. We say that the increasing reflectivity with angle behavior is "at least for light incident in one plane," because sometimes a narrow viewing angle (more collimation) is desired for only one viewing plane, and a wider viewing angle (less collimation) is desired in the orthogonal plane. An example is some LCD TV applications, where a wide viewing angle is desired for viewing in the horizontal plane, but a narrower viewing angle is specified for the vertical plane. In other cases, narrow angle viewing is desirable in both orthogonal planes so as to maximize on-axis brightness. In this manner, light from a recycling cavity or film stack can be collimated to a significant degree, and a polarized light output from a single film construction can be provided.

In the following discussion of reflectivity and transmission characteristics we can initially assume reflectivity and transmission are determined as broad averages across a range of wavelengths. Later discussion will focus on sloped transmission and reflection spectra across the visible band, and reflectivity and transmission characteristics are wavelength dependent and need to be characterized within specific wavelength regions.

Figure 2:
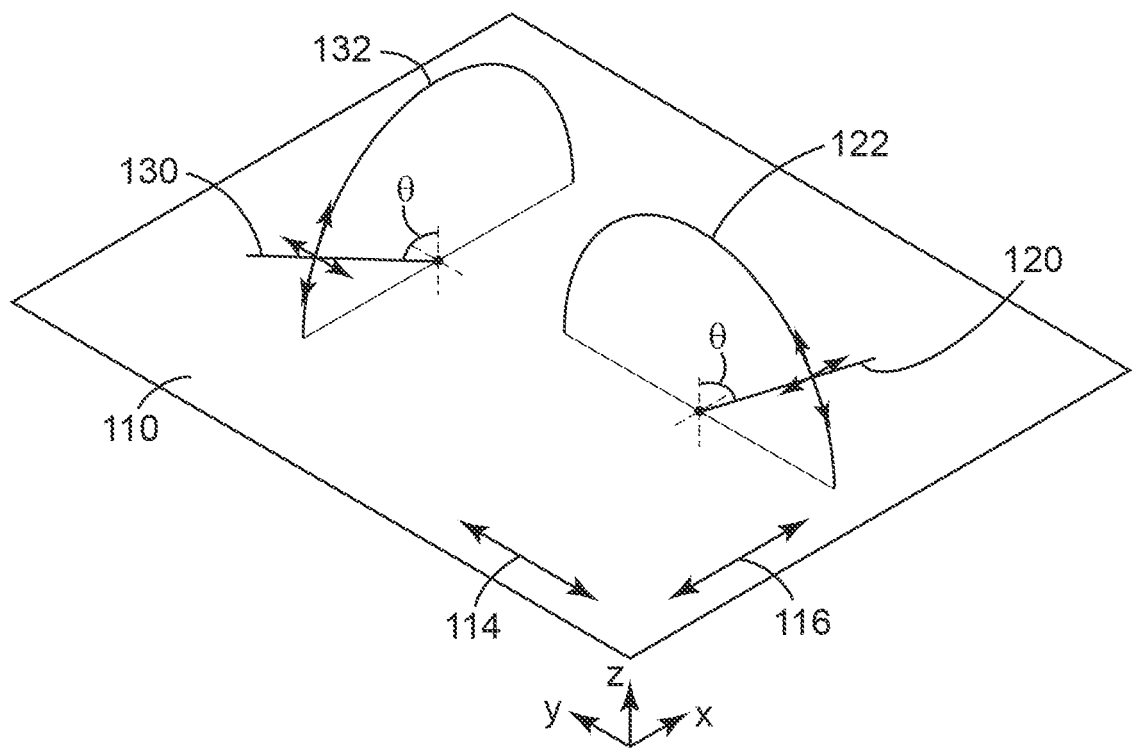
FIG. 2 is a is a schematic perspective view a reflective polarizing film.

As we discuss oblique angle reflectivity, it is helpful to keep in mind the geometrical considerations of FIG. 2. There, we see a surface 110 that lies in an x-y plane, with a z-axis normal direction. As the surface is a polarizing film or partially polarizing film (such as those described in International Application Nos. PCT/US2012/060485 and PCT/US2012/060483) we designate for purposes of this application the y-axis as the "pass axis" and the x-axis as the "block axis." In other words, normally incident light whose polarization axis is parallel to the y-axis is preferentially transmitted compared to normally incident light whose polarization axis is parallel to the x-axis.

Light can be incident on surface 110 from any direction, but we concentrate on a first plane of incidence 132, parallel to the x-z plane, and a second plane of incidence 122, parallel to the y-z plane. "Plane of incidence" refers to a plane containing the surface normal and a particular direction of light propagation. We show in FIG. 2 one oblique light ray 130 incident in the plane 132, and another oblique light ray 120 incident in the plane 122. Assuming the light rays to be unpolarized, they will each have a polarization component that lies in their respective planes of incidence (referred to as "p-polarized" light), and an orthogonal polarization component that is oriented perpendicular to the respective plane of incidence (referred to as "s-polarized light" and labeled "s" in FIG. 2). It is important to note that for reflecting polarizing films, "s" and "p" can be aligned with either the pass axis or the block axis, depending on the direction of the light ray. In FIG. 2, the s-polarization component of ray 130, and the p-polarization component of ray 120, are aligned with the pass axis (the y-axis) and thus would be preferentially transmitted, while the opposite polarization components (p-polarization of ray 130, and s-polarization of ray 120) are aligned with the block axis (x-axis).

With this in mind, let us consider the meaning and consequences of specifying that the collimating birefringent reflective polarizer "exhibits a reflectivity that generally increases with angle of incidence." This reflective property, used in conjunction with a recycling backlight is generally described in commonly owned and assigned U.S. Patent Publication No. 2010/0156953, and No. 2010/0165660. Collimating birefringent reflective polarizers with enhanced collimating properties are further described in PCT Application No. PCT/US2012/060485 wherein the reflection spectra are sloped. For an instance where a light of a preferred polarization is desirable, the collimating birefringent reflective polarizer includes a multilayer construction (e.g., coextruded polymer microlayers that have been oriented under suitable conditions to produce desired refractive index relationships and desired reflectivity characteristics) having a very high reflectivity for normally incident light in the block polarization state and a lower but still substantial reflectivity (e.g., 20% to 90%) for normally incident light in the pass polarization state. The very high reflectivity of block-state light (p-polarized component of ray 130, and s-polarized component of ray 120) generally remains very high for all incidence angles. The more interesting behavior is for the pass-state light (s-polarized component of ray 130, and p-polarized component of ray 120), since that exhibits an intermediate reflectivity at normal incidence. Oblique pass-state light in the plane of incidence 132 will exhibit an increasing reflectivity with increasing incidence angle due to the nature of s-polarized light reflectivity (the relative amount of increase, however, will depend on the initial value of pass-state reflectivity at normal incidence). Thus, light emitted from a recycling backlight with a collimating birefringent reflective polarizer front film in a viewing plane parallel to plane 132 will be partially collimated or confined in angle. Oblique pass-state light in the other plane of incidence 122 (i.e., the p-polarized component of ray 120), however, can exhibit any of three behaviors depending on the magnitude and polarity of the z-axis refractive index difference between microlayers relative to the in-plane refractive index differences. See, e.g., U.S. Pat. No. 5,882,774.

In one case, a Brewster angle exists, and the reflectivity of this light decreases with increasing incidence angle. This produces bright off-axis lobes in a viewing plane parallel to plane 122, which are usually undesirable in LCD viewing applications (although in other applications this behavior may be acceptable, and even in the case of LCD viewing applications this lobed output may be redirected towards the viewing axis with the use of a prismatic film and such).

In another case, a Brewster angle does not exist or is very large, and the reflectivity of the p-polarized light is relatively constant with increasing incidence angle. This produces a relatively wide viewing angle in the referenced viewing plane.

In the third case, no Brewster angle exists, and the reflectivity of the p-polarized light increases significantly with incidence angle. This can produce a relatively narrow viewing angle in the referenced viewing plane, where the degree of collimation is tailored at least in part by controlling the magnitude of the z-axis refractive index difference between microlayers in the collimating birefringent reflective polarizer.

Thus, the increase in reflectivity with incidence angle in the collimating birefringent reflective polarizer can refer to light of a useable polarization state incident in a plane for which oblique light of the useable polarization state is p-polarized for an incidence plane, and s-polarized for the orthogonal incidence plane. Alternately, such increase in reflectivity can refer to the average reflectivity of unpolarized light in any plane of incidence.

In many embodiments, the collimating birefringent reflective polarizers of a recycling cavity or film stack, also have a sloped transmission spectrum, and often a blue-sloped transmission spectrum for light incident in both planes of incidence for either a usable polarization state, or for unpolarized light in any plane of incidence.

Referring back to FIG. 1, an absorbing polarizer 104 can be stacked between the collimating birefringent reflective polarizer 102 and first birefringent reflective polarizer 106, and potentially laminated to one or more of the reflective polarizers, co-extruded with one or more of the reflective polarizers or coated onto and oriented with one or more reflective polarizers. In some exemplary embodiments, the entire stack 100 illustrated in FIG. 1 may be coextruded as a single film, or parts of it can be separately extruded and laminated, or first oriented and then laminated.

Consider an ARCP located between a recycling backlight and the glass surface upon which resides the pixilated Liquid Crystal Display (LCD) structure(s), where the usual absorbing display polarizer of the LCD that faces the recycling backlight, is removed. The spectral transmission and reflection properties of an ARCP can conveniently be defined by its hemispheric reflectivity spectrum, $R^f_{hemi}(\lambda)$, and by its transmission spectrum for light polarized along either the pass axis of the LCD system $T^{pass}(\Omega,\lambda)$ and for light linearly polarized along the orthogonal, block axis of the LCD system, $T^{block}(\Omega,\lambda)$.

The ARCP films of this invention, when used in a recycling backlight, can provide for brightness enhancement of the white state of the LCD and simultaneously provide a low intensity dark state for the LCD.

More generally, the desired ARCP property of providing enhanced intensity of light passage through white-state LC cells and overlying polarizer, and near zero intensity of light passage through dark-state LC cells and overlying polarizer, should be controlled across the visible spectrum so that the perceived color of the liquid crystal display is not biased or distorted by the ARCP/backlight system. If the ARCP/backlight system delivers light to the LCD that is inconsistent with the engineered chromaticity balance of the display light source (e.g. compact fluorescent bulbs or a display-grade white LED) and the color filters in each LC cell, then the LCD image will have distorted color hues and white point values, and in addition, can have low-light image-areas (black or very dark areas of an image) that have a colored hue, such as a bluish tint or a magenta, or reddish tint.

Absorbing polarizers, such as absorbing polarizer 104, are also suitable for use in the present disclosure. One useful polarizing absorptive element is an oriented, dye-containing, polyvinyl alcohol (PVA) film. Examples of such films and their use as polarizing absorptive elements are described, for example, in U.S. Pat. Nos. 4,895,769, and 4,659,523 and PCT Publication No. WO 95/17691, all of which are incorporated herein by reference. To function as an absorbing polarizer, the polyvinyl alcohol film is typically stretched to orient the film. When stained with a polarizing dye or pigment, the orientation of the film determines the optical properties (e.g., the axis of extinction) of the film. Preferably, the absorbing element is such that absorption of light polarized along the block axis does not decrease (and sometimes increases) with increased angle of incidence. One example of such absorbing polarizers are those polarizers including supra-molecular lyotropic liquid-crystalline material, as described in Lazarev et al. article, entitled "Low-leakage off-angle in E-polarizers", Journal of the SID 9/2, pp. 101-105 (2001), incorporated by reference herein.

Suitable IR and visible absorbing dyes utilized in the absorbing polarizer include dyes with good thermal stability that can be melt-processed with, for example, polyesters, e.g. PEN. The selection of the light absorbing material can be made based on factors, such as, for example, the absorbance spectrum of the light absorbing material, cost, processability, stability, and compatibility with other elements in the optical filter.

A light absorbing material may be selected such that the material has a dichroic ratio of at least 5:1, 10:1, or potentially even 20:1. Dichroic ratio may generally be understood as the ratio of the absorption constant in the block polarization to the absorption constant in the pass polarization. It will be appreciated that many light absorbing materials suitable for broadband absorptive elements have substantial absorbance over a relatively wide range of wavelengths or a relatively constant absorbance value over portions of both the transmission and reflection wavelength ranges. The use of the combination of an absorbing polarizer between two reflective polarizers can allow the use of lower loadings of light absorbing material than if the absorptive element was used alone or with a single reflective element.

Absorbing polarizers used in exemplary embodiments of the present disclosure have a contrast ratio of less than 1000:1, thus making the contribution of the reflective polarizers more important. In some exemplary embodiments, the contrast ratios of absorbing polarizers may be about 500:1 or less, about 100:1 or less, about 10:1 or less, or about 5:1 or less. In some exemplary embodiments, the absorbing polarizer may be characterized by a contrast ratio of about 5:1 to about 100:1. One of skill in the art will understand that contrast ratio may generally be understood as the ratio of the percentage of transmitted light polarized parallel to the pass axis to the percentage of transmitted light polarized parallel to the block axis.

Where the absorbing polarizer of the reflective/absorbing/reflective polarizer combination has a contrast ratio of up to about 10:1, at least one of the reflective polarizers preferably has a contrast of at least about 100:1. In other exemplary embodiments, one or both of the biaxial reflective polarizers may be characterized by a contrast ratio of at least about 50:1, at least about 100:1 or at least about 200:1. The polarizer stack combination (such as stack 100 of FIG. 1) according to the present disclosure may have a total contrast ratio of about 500:1 or more or about 1000:1 or more. In at least one embodiment, the contrast ratio of the polarizer stack (or ARCP) may be 5,000:1 or more, or potentially 6,000:1 or more. In some exemplary embodiments, the contrast ratio of the polarizer stack according to the present disclosure may be as high as about 10,000:1.

Figure 3:
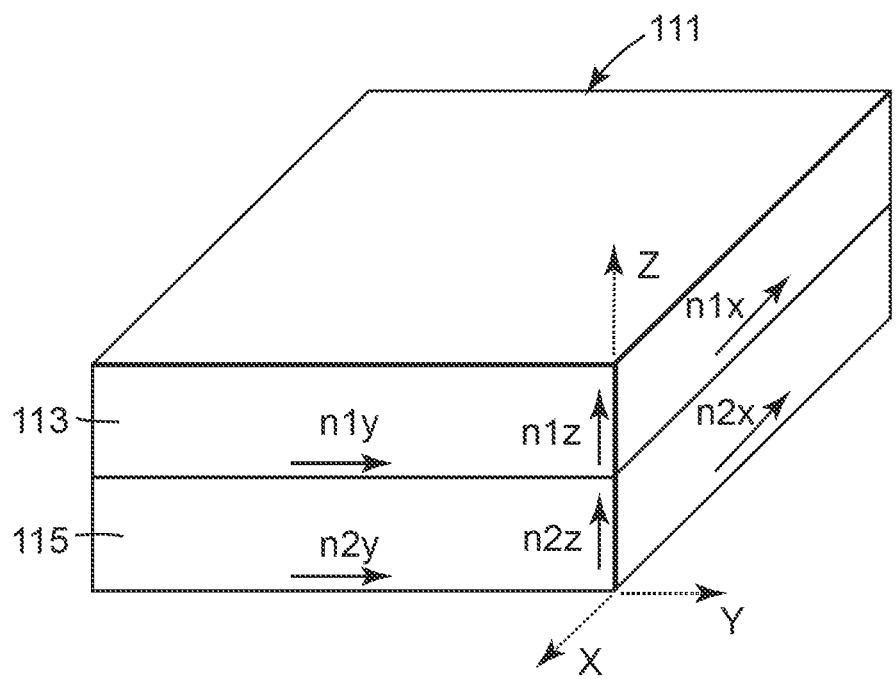
FIG. 3 is a schematic perspective view of a reflective polarizer according to the present disclosure.

Referring back to FIG. 1, the third element of polarizer stack 100 not yet described in detail is first birefringent reflective polarizer 106. Any number of appropriate birefringent reflective polarizers may be employed. For example, FIG. 3 illustrates one potential exemplary embodiment of a reflective polarizer according to the present disclosure, which is a multilayer optical film 111 that includes a first layer of a first material 113 disposed (e.g., by coextrusion) on a second layer of a second material 115. The depicted optical film 111 may be described with reference to three mutually orthogonal axes x, y and z. Two orthogonal axes x and y are in the plane of the film 111 (in-plane, or x and y axes) and a third axis (z-axis) extends in the direction of the film thickness. One or both of the first and second materials may be birefringent.

While only two layers are illustrated in FIG. 3 and generally described herein, typical embodiments of the present disclosure include two or more of the first layers interleaved with two or more of the second layers. The total number of layers may be hundreds or thousands or more. In some exemplary embodiments, adjacent first and second layers may be referred to as an optical repeating unit. Reflective polarizers suitable for use in exemplary embodiments of the present disclosure are described in, for example, U.S. Pat. Nos. 5,882,774, 6,498,683, 5,808,794, which are incorporated herein by reference.

The optical film 111 may include additional layers. The additional layers may be optical, e.g., performing an additional optical function, or non-optical, e.g., selected for their mechanical or chemical properties. As discussed in U.S. Pat. No. 6,179,948, incorporated herein by reference, these additional layers may be orientable under the process conditions described herein, and may contribute to the overall optical and/or mechanical properties of the film, but for the purposes of clarity and simplicity these layers will not be further discussed in this application.

In a birefringent reflective polarizer, the refractive indices of the first layers 113 ($n_{1x}$, $n_{1y}$, $n_{1z}$) and those of the second layers 115 ($n_{2x}$, $n_{2y}$, $n_{2z}$) are substantially matched along one in-plane axis (y-axis) and are substantially mismatched along another in-plane axis (x-axis). The matched direction (y) forms a transmission (pass) axis or state of the polarizer, such that light polarized along that direction is preferentially transmitted, and the mismatched direction (x) forms a reflection (block) axis or state of the polarizer, such that light polarized along that direction is preferentially reflected. Generally, the larger the mismatch in refractive indices along the reflection direction and the closer the match in the transmission direction, the better the performance of the polarizer.

To function well for wide angle viewing of a display device, a display polarizer should maintain high block state contrast for all angles of incidence and also maintain high pass transmission over all angles of incidence. As it has been shown in the commonly owned U.S. Pat. No. 5,882,774, pass state transmission increases when the refractive indices of the alternating first and second layers 113 and 115 are matched for light polarized along the z-axis and for light polarized along the y-axis. The z-index matching also ensures that the block state transmission does not degrade at high angles of incidence.

In exemplary embodiments, at least one of the collimating birefringent reflective polarizer or first birefringent polarizer in a polarizer stack may be biaxial, that is, having $\Delta n_{yz}$ of more than about 0.05 for a particular birefringent polarizer material. In other exemplary embodiments, $\Delta n_{yz}$ can be at least 0.08 or another suitable value depending on the application or at least about 0.1 or greater. All values of refractive indices and refractive index differences are reported for 633 nm.

In at least some embodiments, the first birefringent reflective polarizer 106 on the opposite side of absorbing polarizer 1104 from collimating birefringent reflective polarizer 102 may in fact itself also be a collimating reflective polarizer. Therefore, first birefringent reflective polarizer 106 may have all of the properties discussed above with respect to collimating birefringent reflective polarizer 102.

Figure 4:
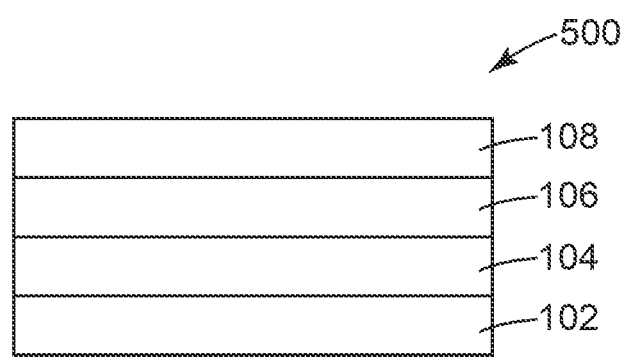
FIG. 4 is a cross-sectional view of a polarizer stack according to the present description.
Figure 5:
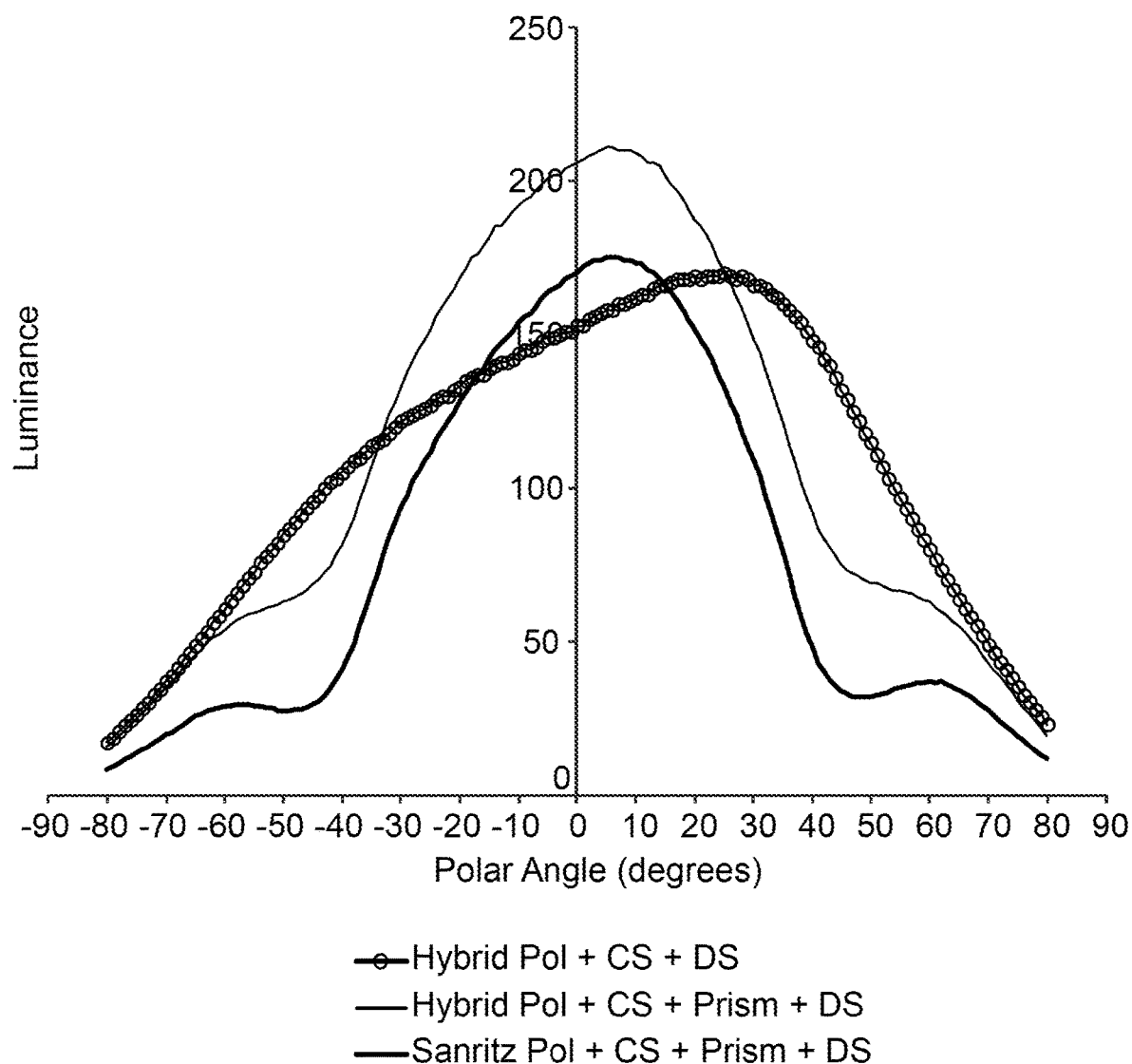
FIG. 5 is a graph of luminance data versus polarizer angle for various polarizer stacks.

Yet another example of an appropriate polarizer stack according to the present description is illustrated in FIG. 4. Like polarizer stack 100, polarizer stack 400 includes a first birefringent reflective polarizer 106, and a collimating birefringent reflective polarizer 102. Absorbing polarizer 104 is positioned between first birefringent reflective polarizer 106 and collimating birefringent reflective polarizer 102. Additionally, the embodiment illustrated in FIG. 4 contains a second absorbing polarizer 108 that is positioned on the opposite side of first birefringent reflective polarizer 106 from the first absorbing polarizer 104. Generally, the second absorbing polarizer 108 may have similar or identical properties to those of absorbing polarizer 104, described in detail above. It may be particularly useful to utilize a second absorbing polarizer where one is seeking increased dark-state extinction, or in instances where one is seeking to reduce glare from the viewer side of a display.

The present day LCD industry is focused on both high performance and low cost products. A high performance absorbing, reflecting and collimating polarizer stack can be made by laminating separately manufactured high performance iodine dyed PVA polarizers with the appropriate collimating reflective polarizer, such as those described above. However, the high performance iodine dyed polarizers are costly, and furthermore their orientation direction, i.e. block axis direction, is typically in the downweb direction (machine or MD direction) whereas oriented multilayer PEN based reflecting polarizers are most conveniently oriented in the crossweb direction (transverse or "tenter" direction). For this reason they cannot be continuously joined together with a low cost roll-to-roll lamination method, but at least one must be first cut into piece parts which are then rotated 90 degrees and then laminated individually to the other polarizer film. PVA coatings can be applied to a multilayer polarizer film before orientation of the multilayer in a tenter, but we have found that the large difference in the preferred orientation temperatures of PVA and PEN result in poor quality of one or the other of the absorbing and reflective components. A lower performing and lower cost iodine/PVA polarizer can be utilized in the present invention in place of the alternate dyes that cited in this description, but this substitution does not solve the problem of the cost of the lamination process. Thus, there is still a need in the art for a low cost, high performance absorbing reflecting collimating polarizer. As disclosed herein, certain polarizing dyes can be compounded into polyester resins such as PEN and PET or their copolymers and then extruded and oriented at the temperatures preferred for processing the polyesters. In this manner, low cost absorbing polarizers can be fabricated as an integral part of the polarizer stack with no further processing.

We now discuss further the interaction of the various polarizers in polarizer stacks 100, 400, or the like. As taught in commonly owned and assigned PCT Application No. PCT/US2012/060483 ("PCT/US2012/060483"), a collimating reflecting polarizer (such as polarizer 102) provides enhanced collimation if the spectrum is sloped, with decreasing transmission as the wavelength increases. For purposes of this description, we define this as a negative slope (as will be described in greater detail below). Reflective polarizers with relatively large negative slopes for the pass axis transmission were disclosed in U.S. 61/549,588. When the pass axis exhibits a large slope, the block axis will also exhibit a similar slope, although not exactly the same slope due to different indices of refraction for the block versus pass axis, and also due to large differences in the absolute values of transmission on the linear scale on which the transmission is based. A large negative slope on the block axis transmission polarizers can result in a substantial leak for blue light, which can substantially discolor the dark state of an LCD panel. The collimating polarizers of PCT/US2012/060483 were used in a backlight for an LCD panel that included high performance absorbing polarizers. The block axis of standard LCD panel polarizers are selected for minimal dark state leakage and eliminate such a problem.

For the integrated reflective absorptive collimating polarizer stacks disclosed herein, there will be no additional absorbing polarizer on the panel (as is customary) to absorb any light leakage. The integrated polarizer must provide both good dark state, i.e., a low block axis transmission at all visible wavelengths, as well as provide for a substantial collimation effect when used in an LCD system with a recycling backlight. In addition, the pass axis must transmit acceptable levels for white state brightness. For the latter reason, simply lowering the block state transmission by using more ¼ wave layers, or a lower index of refraction for the isotropic low index material in the polarizer is not acceptable because it has the detrimental effect of also reducing the pass axis transmission to unacceptably low levels. The low index material is somewhat constrained for collimating reflective polarizers since it preferably has an index of refraction that is midway between the y and z indices of the high index birefringent layers.

We have found that an acceptable color balanced block state dark level, acceptable collimation, and an acceptable pass state transmission level can all be simultaneously achieved if the block transmission spectra of the first birefringent reflective polarizer 106 and of the collimating reflective polarizer 102 have oppositely sloped spectra. The pass axis transmission spectrum of the collimating reflective polarizer can be flat or slightly negative.

As discussed in PCT/US2012/060483, portions of the infrared spectrum shift into the visible spectrum for light that is incident at oblique angles on the collimating polarizer. The parts of the spectrum that are primarily responsible for reflecting and effectively collimating obliquely incident white light are the green, red and near IR portions of the spectrum that is measured at normal incidence. For this reason, the slope of those portions of the spectrum are most pertinent, both for the block and for the pass axis of the individual reflective polarizers.

For the polarizer stack as a whole, it is worthwhile to assess a slope determination for the visible spectrum only because the absorbing dye spectra do not shift with angle. Accordingly, the visible slope calculation is also provided to characterize the "color neutrality" of the polarizer stack or ARCP as a whole.

The transmission spectra of multilayer polymeric interference filters such as collimating reflective polarizers can often appear to be relatively noisy, e.g. interference effects can result in many local minima and maxima due to oscillations in the spectra. However, there are several ways to estimate or gauge the average slope of a spectrum over a broad wavelength range. Curve fitting to linear or polynomial functions of low order is one method. A simpler method is to determine average transmission values in local groups of wavelengths. For example, the average transmission in a broadband visible and IR spectrum can be calculated for subsets of the IR, red and green wavelength ranges: $IR_{avg}$, $R_{avg}$, and $G_{avg}$. A spectrum slope can be then calculated as:

$$\text{Slope}=(IR_{avg}-G_{avg})/\text{AVG},$$

where AVG is the simple arithmetic average of the three wavelength averages given by:

$$\text{AVG}=(IR_{avg}+R_{avg}+G_{avg})/3.$$

Any discussion with respect to "slope" of a first birefringent reflective polarizer or collimating birefringent reflective polarizer will be understood to refer to the slope calculation above (i.e. that taking into account IR, Red and Green).

In another sense, one can determine slope of the spectra that will include only the visible spectrum. In such a case, the average transmission can be calculated for subsets of the blue, red and green wavelength ranges: $B_{avg}$, $R_{avg}$, and $G_{avg}$. A visible slope can be then calculated as:

$$\text{Visible Slope}=(B_{avg}-R_{avg})/\text{Visible AVG},$$

where Visible AVG is the simple arithmetic average of the three wavelength averages given by:

$$\text{Visible AVG}=(B_{avg}+R_{avg}+G_{avg})/3.$$

Any discussion with respect to "visible slope" of the polarizer stack/ARCP will be understood to refer to the slope calculation immediately above (i.e. that taking into account Blue, Red and Green).

The local color ranges are selected as Blue=450 nm to 500 nm: Green=500 to 560 nm, Red=600 to 650 nm and IR=700 to 750. One of skill in the art will understand that slope may be expressed as either a fraction or a percentage.

For purposes of this description, a "neutral" visible slope will be defined as having an absolute value of 15%, 10%, 5% or less, or potentially 3% or less, and potentially even close to 0. The polarizer stack of the present description or ARCP may generally be understood to have a neutral visible slope for transmitted light (i.e., the pass axis transmission of the polarizer stack as a whole is substantially neutral across the visible wavelength band).

In the present description, the slope of the transmission spectrum in the pass state (i.e. $T^{pass}(0,\lambda)$) for the collimating birefringent reflective polarizer may be less than 0 and less than −5% or less than −10% or less than −20% or less than −30% or less than −40% or less than −50%. The slope of the transmission spectrum in the block state (i.e. $T^{block}(0,\lambda)$) may be less than 0 or less than −10% or less than −50% or less than −100% or less than −150% or less than −200%.

The slope of the transmission spectrum in the pass state (i.e. $T^{pass}(0,\lambda)$) for the first birefringent reflective polarizer may be greater than 0 and greater than 5% or greater than 10% or greater than 20% or greater than 30% or greater than 40% or greater than 50%. The slope of the transmission spectrum in the block state (i.e. $T^{block}(0,\lambda)$ may be greater than 0 or greater than 10% or greater than 50% or greater than 100% or greater than 150% or greater than 200%.

An indication of the potential degree of collimation of light from a polarizer stack can be obtained from the ratio of transmitted visible light at normal incidence and 60 degrees incidence of a given film. In most LCD TVs, the rear polarizer on the LCD panel is aligned with its pass axis in the horizontal direction. Thus the plane of incidence of p-polarized pass axis light is along the horizontal direction (left and right). The plane of incidence of s-polarized pass axis light is therefore in the vertical direction. Thus it is the backlight emission of s-polarized light that determines the brightness of the LCD panel when viewed from above or below the centerline and the backlight emission of p-polarized light that determines the viewing brightness from the left or the right. For this reason, the pass axis spectra of the three film examples are shown for s-polarized and for p-polarized light at 60 degrees and at normal incidence.

In the present description, visible light transmitted in the pass axis at 60 degrees incidence ("$T^{pass}60$") may be divided by light transmitted in the pass axis at 0 degrees incidence ("$T^{pass}60$") to determine level of collimation. Such measurements may be taken for both s-polarized and p-polarized light. The currently described polarizer stacks exhibit with s-polarized light, a ratio of $T^{pass}60/T^{pass}0$ that is less than 0.75 and further less than 0.60. Similarly, with p-polarized light the currently described polarizer stacks exhibit a ratio of $T^{pass}60/T^{pass}0$ that is less than 0.75 and further less than 0.60. Additionally, one can characterize the polarizer stack in terms of the visible light transmitted in the block axis at 60 degrees ("$T^{block}60$") or at 0 degrees ("$T^{block}0$"). In preferred embodiments of the present description the polarizer stack will have a $T^{block}0$ that is very low, potentially less than $10^{-3}$ or even $0.5 \times 10^{-3}$ or less than $10^{-4}$.

Recycling Backlight with an ARCP Front Element

For illustrative purposes, it is convenient to further define the optical elements of the backlight with a front reflector and back reflector, forming the recycling cavity, and the Liquid Crystal Display panel. In some cases, the present description actually relates to a recycling backlight that may include the polarizer stack or ARCP as described throughout in addition to a light source. The description may also encompass a display that includes a panel and such a backlight.

Figure 7:
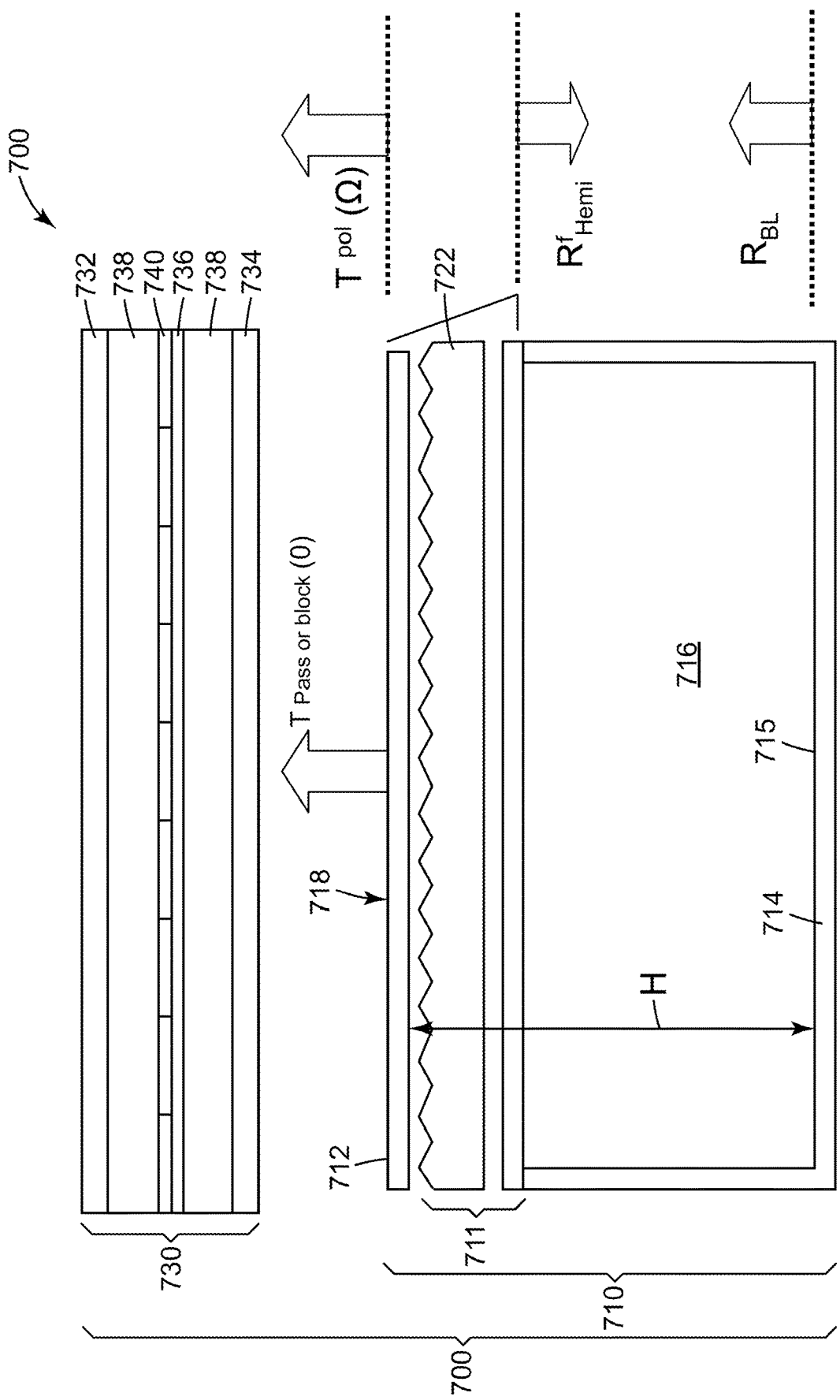
FIG. 7 is a cross-sectional view of a display system with a backlight and LC panel.

FIG. 7 is a schematic cross-section view of a display system 700 that includes a backlight 710 and an LC panel 730. The backlight 710 is positioned to provide light to the LC panel 730. The backlight 710 includes a front reflector 712 and a back reflector 714 that form a light recycling cavity 716 having a cavity depth H and an output region 718 of area Aout. The front reflector 712 may have other elements disposed between it and the back reflector 714, for instance, various light control films, such as micro-structured lenslet arrays, prismatic films and beaded gain diffusers 711. Any suitable films described herein can be utilized to provide the front reflector 712. Generally, the front reflector will be an ARCP.

The LC panel 730 typically includes a layer of LC 736 disposed between panel plates 738. The plates 738 are often formed of glass and may include electrode structures and alignment layers on their inner surfaces for controlling the orientation of the liquid crystals in the LC layer 736. These electrode structures are commonly arranged so as to define LC panel pixels, i.e., areas of the LC layer where the orientation of the liquid crystals can be controlled independently of adjacent areas. A color filter array 740 may also be included with one or more of the plates 738 for imposing color on the image displayed by the LC panel 730.

The LC panel 730 is positioned between a front absorbing polarizer 732 and front reflector 712. It is common practice in the art to position the LC panel 730, between a front and a rear absorbing polarizer, but in this embodiment, the rear absorbing polarizer is replaced by an absorbing, reflecting, collimating and polarizing element, 712, also described as the front reflector (of the recycling backlight). It is understood that the front reflector 712, may be directly attached to the glass plate 738. The absorbing polarizer 732, the front reflector (ARCP) 712, and the LC panel 730 in combination control the transmission of light from a backlight 710 through the display system 700 to the viewer. For example, the absorbing polarizer 732, and the ARCP 712, may be arranged with their pass transmission axes perpendicular to each other. In an unactivated state, a pixel of the LC layer 736 may not change the polarization of light passing therethrough. Accordingly, light that passes through the ARCP 712 is absorbed by the front absorbing polarizer 732. When the pixel is activated, the polarization of the light passing therethrough is rotated so that at least some of the light that is transmitted through the ARCP 712 is also transmitted through the front absorbing polarizer 732. Selective activation of the different pixels of the LC layer 736, for example, by a controller (not shown), results in the light passing out of the display system 700 at certain desired locations, thus forming an image seen by the viewer. The controller may include, for example, a computer or a television controller that receives and displays television images.

One or more optional layers (not shown) may be provided proximate the front absorbing polarizer 732, for example, to provide mechanical and/or environmental protection to the display surface. In one exemplary embodiment, the layer may include a hardcoat over the front absorbing polarizer 732.

It will be appreciated that some types of LC displays may operate in a manner different from that described above. For example, the absorbing polarizers 732, and the ARFC 712, may be aligned parallel and the LC panel may rotate the polarization of the light when in an unactivated state. Regardless, the basic structure of such displays remains similar to that described above.

For analysis purposes in which we consider the front and back reflector to be of substantially infinite extent, we can define a back reflector effective reflectivity for visible unpolarized light, $R_{BL}$, as including all of the reflective and loss elements within the interior of the recycling cavity other than the aperture defining the output surface. In this regard, loss elements such as LED dies, lenses, packaging, circuitry, and exposed circuit board, are included in an area-fraction sense, with the surrounding high-reflectivity materials, to determine $R_{BL}$. Further, physical gaps between reflective surfaces are also included in defining this effective reflectivity. The physical location of this $R_{BL}$ surface can then be conveniently drawn as coincident with the mean surface of the physical cavity interior. Often, for well constructed recycling cavity backlights, the reduction of $R_{BL}$ from the measured value(s) of $R^b_{hemi}$ for the back reflector material, is a few percent or less and will therefore be ignored here.

Further, it is convenient to define the optical properties of the ARCP using the simple constructs $R^f_{hemi}(\lambda)$, $T^{pass}(\Omega, \lambda)$ and $T^{block}(\Omega, \lambda)$: $T^{pass}(\Omega, \lambda)$ is the transmission of light polarized along either the pass axis of the LCD system, $T^{block}(\Omega,\lambda)$ is the transmission of light linearly polarized along the orthogonal, block axis of the LCD system, $\Omega$ represents the solid angle of interest representing a viewers' geometrical location relative to the backlight output surface.

A particular value of Ω, can be represented by a combination of the defined plane of incidence (22 and 24), with the incidence angle θ.

Furthermore, it is convenient to define front reflector and back reflector properties $R^f_{hemi}(\lambda)$ $R^b_{hemi}(\lambda)$ and $T^{pass}(\Omega, \lambda)$ and $T^{block}(\Omega, \lambda)$, as wavelength specific spectra properties, or alternatively, as averages across the visible band, in which case they are written as $R^f_{hemi}$, $R_{BL}$, and $T^{pass}(\Omega, \lambda)$ and $T^{block}(\Omega, \lambda)$. For the purposes of this invention, the visible averages are taken as the spectrum average values within the wavelength range of 450 nm to 650 nm. Further, where the visible spectrum is discussed in the present description, it should be understood to mean the wavelength range from 450 nm to 650 nm.

$R^f_{hemi}(\lambda)$ is a measurable quantity, describing the hemispherical reflectivity of the ARCP. As noted, numerous other optical films and optical elements may be disposed between the ARCP and the backlight back reflector element, such as prismatic films, microlens array films, and beaded gain diffusers, to name a few. The elements may be laminated or spaced apart, but in general they operate together as a system to recycle light from the backlight light sources in order to either thoroughly mix the light within the cavity, or to collimate the light in the cavity towards the normal angle, prior to interaction with the overlaying ARCP/LCD panel. The optical elements below the ARCP can include diffusive elements such as diffuser plates, and surface structure diffusers, as well as refractive elements such as lenticular and/or prismatic films.

The values of $T^{pass}(\Omega, \lambda)$ and $T^{block}(\Omega,\lambda)$, are defined as a transmission coefficients: the ratio of the transmitted intensity at an angle centered on the viewer angle of interest, Ω (relative to the front reflector plane), with the front reflector and an absorbing polarizer overlaying an all-angle light source (e.g., an angle-mixed recycling cavity), to the intensity at 0 degrees for only the absorbing polarizer overlaying the all-angle light source. For this measurement, the polarization properties of the front reflector are appropriately aligned with the pass axis of the absorbing polarizer. $T^{pass}(\Omega,\lambda)$ and $T^{block}(\Omega,\lambda)$ spectra have been measured for the examples below using a Perkin Elmer L-1050 spectrophotometer.

The spectral transmission and reflection properties of an ARCP is comprised of the individual spectral transmission and reflection properties of each of the optical components of the ARCP: a first birefringent reflective polarizer disposed nearest to the recycling backlight element, 106, an absorbing polarizer 104 and a collimating birefringent reflective polarizer 102 that is positioned on the opposite side of the absorbing polarizer from first birefringent polarizer 106. Optionally, an additional absorbing polarizer may be disposed adjacent to the LCD structure.

It is understood in the art, that if the reflection and transmission properties of the MOF components of an ARCP are known, and the absorbing properties of the dichroic absorbing elements are known, then a numerical combination of each of the individual elements will determine the overall spectral transmission and reflection properties of the ARCP.

The relationships among the ARCP spectral transmission and reflection properties, and spectral light intensity of each of the orthogonal linear polarizations (pass and block) delivered by the ARCP/recycling backlight system to the overlying LCD, can be seen by referencing the following relationships:

$$\text{Pass Intensity Spectrum}(\Omega, \lambda) = \frac{T^{pass}(\Omega, \lambda)}{1 - R_{BL}(\lambda) * R^f_{Hemi}(\lambda)} \quad \text{Equation 1}$$

$$\text{Block Intensity Spectrum}(\Omega, \lambda) = \frac{T^{block}(\Omega, \lambda)}{1 - R_{BL}(\lambda) * R^f_{Hemi}(\lambda)} \quad \text{Equation 2}$$

For the construction illustrated in FIG. 7, the pass Intensity Spectrum and Block Intensity Spectrum may both be substantially neutral across a visible wavelength band and have the ratio of at least 1,000:1 at normal incidence.

EXAMPLES

Materials

| Abbreviation/ product name | Description | Available from |
|---|---|---|
| PD-325H | Dichroic dye | Mitsui Fine Chemical, Japan |
| PD-335H | Dichroic dye | Mitsui Fine Chemical, Japan |
| PD-104 | Dichroic dye | Mitsui Fine Chemical, Japan |
| PD-318H | Dichroic dye | Mitsui Fine Chemical, Japan |
| OCA 8171 | Optically clear adhesive | 3M Company, St. Paul, MN |
| APF | Advanced Polarizer Film | 3M Company, St Paul, MN |
| Sanritz-5618 | Linear absorbing polarizer available under the trade name HLC2-5618 | Sanritz Corporation, Tokyo, Japan. |
| GN071 PETg | PETg skins | Eastman Chemical, Kingsport, TN |
| PEN pellets | Polyethylene naphthalate resin pellets | 3M Company, St Paul, MN |

Fabrication of Absorbing Polarizer

An absorbing polarizer layer was formed using the following process. PEN pellets were fed into a twin screw extruder at a rate of 22.7 kg/hr (50.1 pounds per hour (pph)). Dichroic dyes purchased from Mitsui Chemical were also fed into the twin screw extruder at the following rates: PD-104: 45 g/hr (0.10 pph), PD-325H: 59 g/hr (0.13 pph), PD-335H: 32 g/hr (0.07 pph), and PD-318H: 77 g/hr (0.17 pph). This mixture was fed along with GN071 PETg skins at a rate of 22.7 kg/hr (50 pph) on each side through a 41 cm (16 inch) die to form a cast sheet with a speed of 6.1 m/min (20 feet per minute). The cast sheet was stretched in a tenter at a ratio of 5.6:1 at a temperature of 143° C. (290° F.) with a speed of 6.1 m/min (20 feet per minute).

Comparative Example C1

A hybrid polarizer was constructed by laminating the following stack together using optically clear adhesive OCA 8171 between layers: an absorbing polarizer layer, APF (advanced polarizer film a multilayer optical film), a second absorbing polarizer layer, and a second APF layer. The absorbing polarizer layers were as described in "Fabrication of Absorbing Polarizer".

Figure 6:
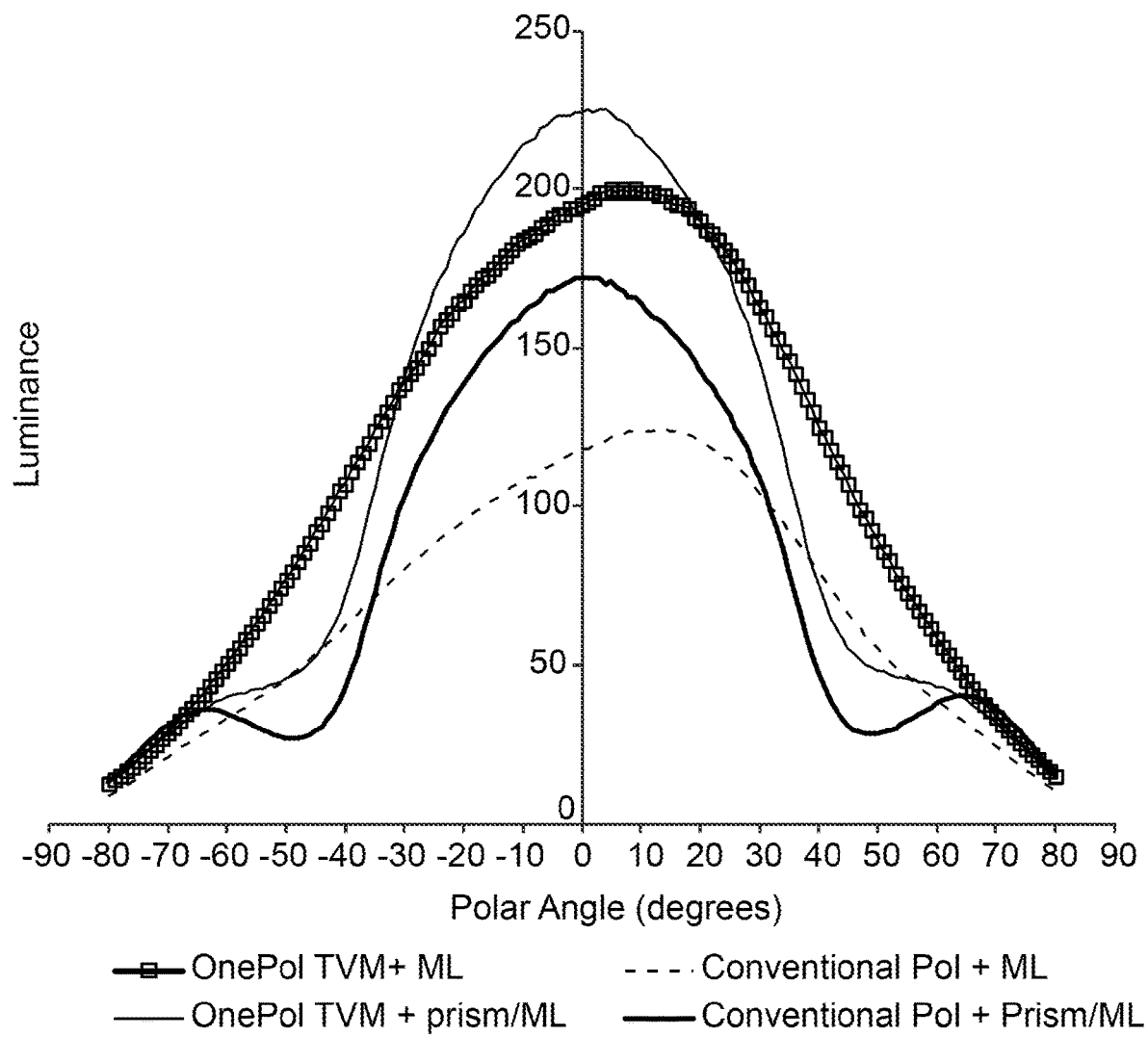
FIG. 6 is a graph of luminance data versus polarizer angle for various polarizer stacks.

A Westinghouse LD-3240 model television was obtained. The film stack behind the LCD panel in the TV contained a polarizer, a cover sheet, a diffuser sheet and a prism film. These films were removed from the LCD panel and used to assemble the stacks indicated in Table 1. The 90 degree (azimuthal) luminance of the LCD panels with the film stacks indicated in Table 1 was measured as a function of polar angle using a EZ contrast XL 88W conoscope (Model XL88W-R-111124, available from Eldim-Optics, Herouville, Saint-Clair France). The luminance data is shown in FIG. 6.

TABLE 1

| Polarizer Stack | Polar Angle at Maximum Luminance (degrees) | Maximum Luminance (nits) |
|---|---|---|
| Hybrid polarizer + cover sheet + diffuser sheet | 25 | 171 |
| Hybrid polarizer + cover sheet + prism film + diffuser sheet | 6 | 211 |
| Sanritz-5618 polarizer + cover sheet + prism film + diffuser sheet | 6 | 175 |

Comparative Example C2

A Collimating birefringent reflective polarizer was prepared as follows. Two multilayer optical film packets were coextruded as described in Example 3 of PCT Patent Application Number US 2012/060485 except that 325 layers were used in each packet and an absorbing polarizer layer was coextruded at the top surface. The absorbing polarizer layer was made from the materials described above under the header "Fabrication of Absorbing Polarizer."

Example 1

The ARCP polarizer of FIG. 4 was manufactured using the feedblock method described in U.S. Patent Application Publication No. 2011/0272849 entitled "Feedblock for Manufacturing Multilayer Polymeric Films", filed May 7, 2010. Two packets of alternating low and high index polymer layers were coextruded as a cast web and then stretched in a tenter on a continuous film making line. Two absorbing polarizer layers were coextruded along with the two packets with one absorbing polarizer layer placed between the two packets and the other placed at the top of the ARCP stack. The absorbing polarizer layers were made from the resin described above under the header "Fabrication of Absorbing Polarizer." The first packet and the second packet were each a stack of 325 layers where the high index layer was constrained uniaxial PEN and the low index layer was GN701 PETg. The packets were designed so that the first packet was a reflective polarizer and the second packet was a collimating reflective polarizer.

The contrast ratio was determined as the ratio of average pass transmission to average block transmission. The ratio of pass axis p-polarized transmission at the polar angle of 60 degrees to the normal incidence pass axis transmission was also determined A low transmission ratio indicated a strong collimation effect. The results are reported in Table 2 where it can be seen that the ARCP polarizer of Example 1, in contrast to both of the comparative examples, simultaneously gave a low $T^{pass}(60\ p\text{-pol})/T^{pass}(0)$ transmission ratio and a high contrast ratio.

TABLE 2

| Polarizer | $T^{pass}$(60 p-pol)/$T^{pass}$(0) | Contrast Ratio |
|---|---|---|
| Hybrid polarizer (Comparative Example C1) | 0.95 | 5170 |

TABLE 2-continued

| Polarizer | $T^{pass}$(60 p-pol)/$T^{pass}$(0) | Contrast Ratio |
|---|---|---|
| CMOF polarizer (Comparative Example C2) | 0.54 | 10 |
| ARCP polarizer (Example 1) | 0.57 | 6755 |

An LG Flatron IPS231P monitor was obtained. The film stack behind the LCD panel in the monitor contained a polarizer, a prism film and a microlens film. These films were removed from the LCD panel and used to assemble the stacks indicated in Table 3. The 90 degree (azimuthal) luminance of the LCD panels with the film stacks indicated in Table 3 was measured as a function of polar angle using a EZ contrast XL 88W conoscope (Model XL88W-R-111124, available from Eldim-Optics, Herouville, Saint-Clair France). The luminance data is shown in FIG. 7.

TABLE 3

| Polarizer Stack | Polar Angle at Maximum Luminance (degrees) | Maximum Luminance (nits) |
|---|---|---|
| ARCP polarizer + microlens film | 9 | 200 |
| ARCP polarizer + prism film + microlens film | About 0 | 225 |
| Sanritz-5618 polarizer + microlens film | 14 | 125 |
| Sanritz-5618 polarizer + prism film + microlens film | About 0 | 172 |

Example 2a

An absorbing, reflective collimating polarizer of FIG. 4 was fabricated, both without, and with, the dichroic absorbing elements 108 and 104 of FIG. 4. Consider first, the instance where there was no dichroic absorbing element between or adjacent to the first and second reflective polarizers. The first birefringent polarizer was a stack of 325 layers, where the high index layer is constrained uniaxial PEN and the low index material is PETg., and was disposed nearest to the liquid crystal display. The second, collimating, birefringent reflective polarizer was disposed facing (nearest to) the recycling backlight. This second collimating reflective polarizer was also a stack of 325 layers, where the high index layer is constrained uniaxial PEN and the low index is PETg. Each of the first and second reflective polarizers was configured and processed to provide an appropriate pass transmission spectrum and block transmission spectrum.

Figure 8A:
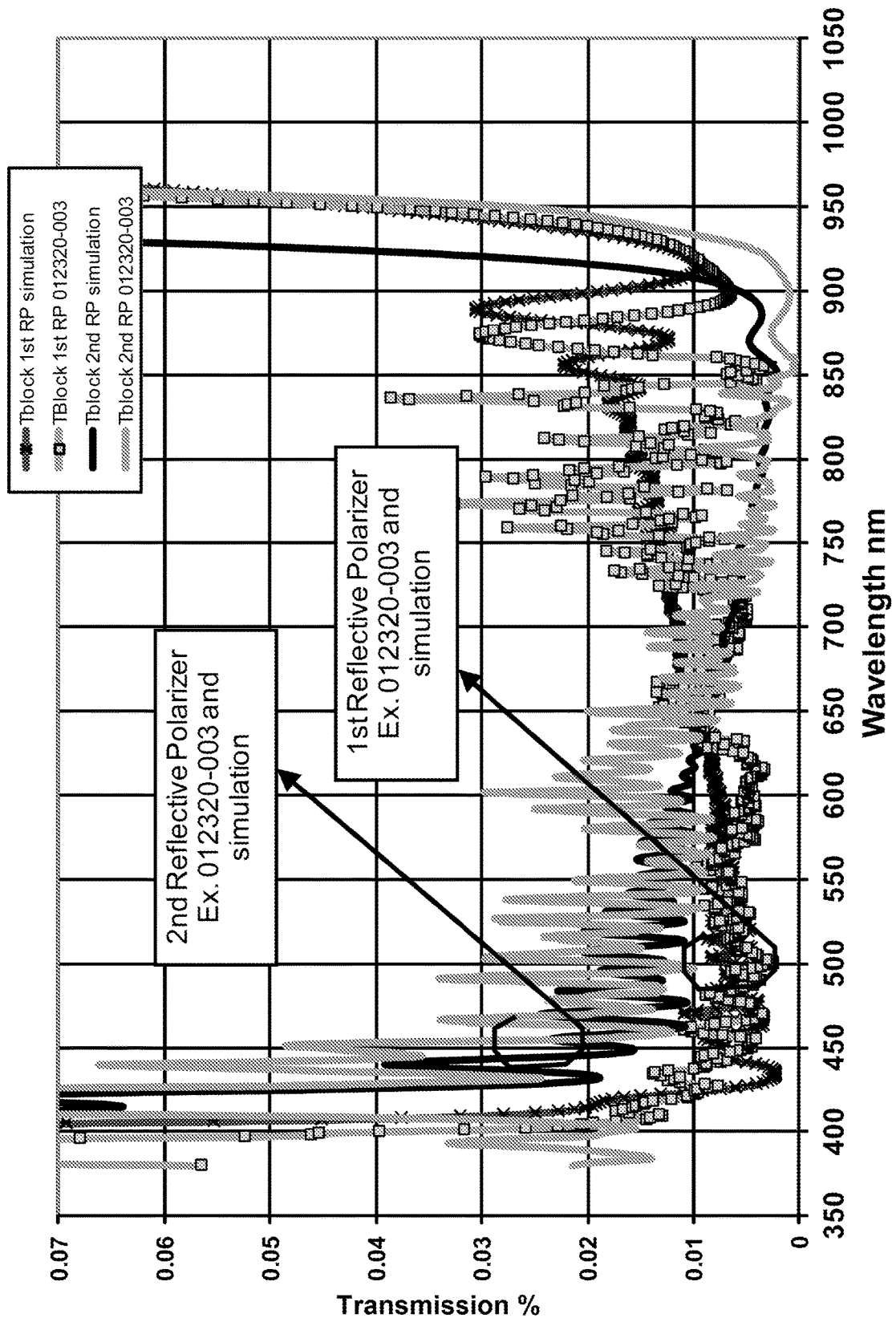
FIGS. 8a-d illustrate transmission spectra of polarizers according to the present description.

The measured block transmission spectra for each of the first and second reflective polarizers is shown in FIG. 8a. Also shown in FIG. 8a are the computed block transmission spectra for each of the first and second reflective polarizers. The computed spectra were obtained using Atomic Force Microscopy (AFM) measurements of each of the 325 layer structures, the measured dispersive refractive index values for each of the 3 orthogonal axes for the PEN and PETg multilayer materials, and employing a 4×4 Berreman Matrix computation engine for a layered optical structure. The computed spectra for the block polarization agreed very well with the measured spectra. This method of employing computed optical spectra, employing input from a combination of AFM and dispersive refractive index values, has been demonstrated to be both accurate and predictive, to those skilled in the art.

Figure 8B:
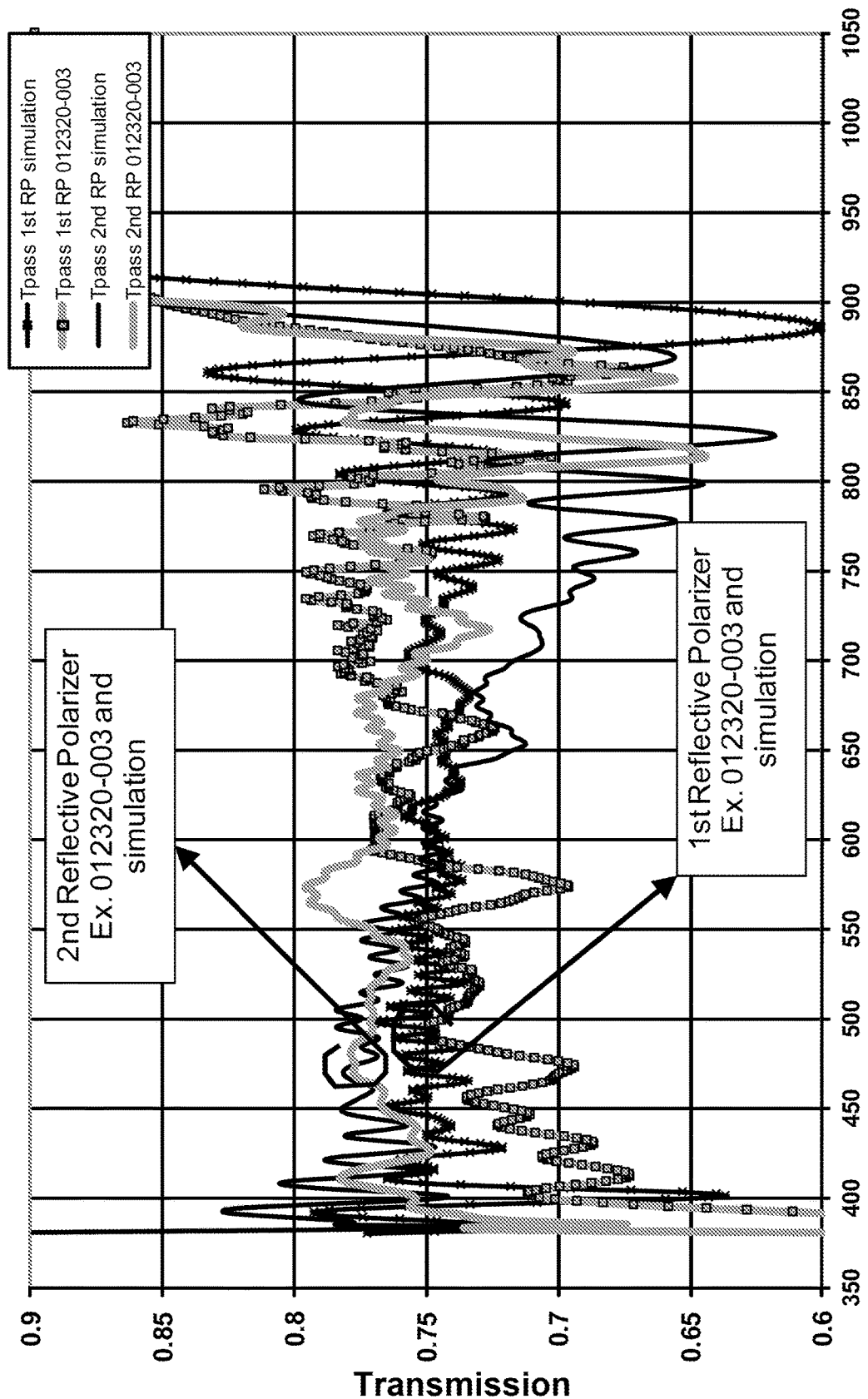

FIG. 8b shows the measured and computed pass spectra for the first and second reflective polarizers of this example. Again, the agreement was very good.

The computed slopes for each of the first and second reflective polarizer elements are shown in Table 4 below.

TABLE 4

|  | $T^{pass}(0, \lambda)$ 1st Refl Pol Measured | $T^{block}(0, \lambda)$ 1st Refl Pol Measured | $T^{pass}(0, \lambda)$ 2nd Refl Pol Measured | $T^{block}(0, \lambda)$ 2nd Refl Pol Measured |
|---|---|---|---|---|
| slope | 5% | 39% | −3% | −81% |

|  | $T^{pass}(0, \lambda)$ 1st Refl Pol Computed | $T^{block}(0, \lambda)$ 1st Refl Pol Computed | $T^{pass}(0, \lambda)$ 2nd Refl Pol Computed | $T^{block}(0, \lambda)$ 2nd Refl Pol Computed |
|---|---|---|---|---|
| slope | −1% | 59% | −9% | −88% |

In summary, the slope for $T^{block}(0,\lambda)$ for the first reflective polarizer was strongly positive (sloped to higher transmission toward the red) and $T^{block}(0,\lambda)$ for the second reflective polarizer was strongly negative (sloped to higher transmission toward the blue). The calculated slope for $T^{pass}(0,\lambda)$ for the first reflective polarizer was "neutral", with close to a zero slope, and the slope for $T^{pass}(0,\lambda)$ for the second, collimating reflective polarizer was modestly negative (sloped to higher transmission toward the blue).

Figure 8C:
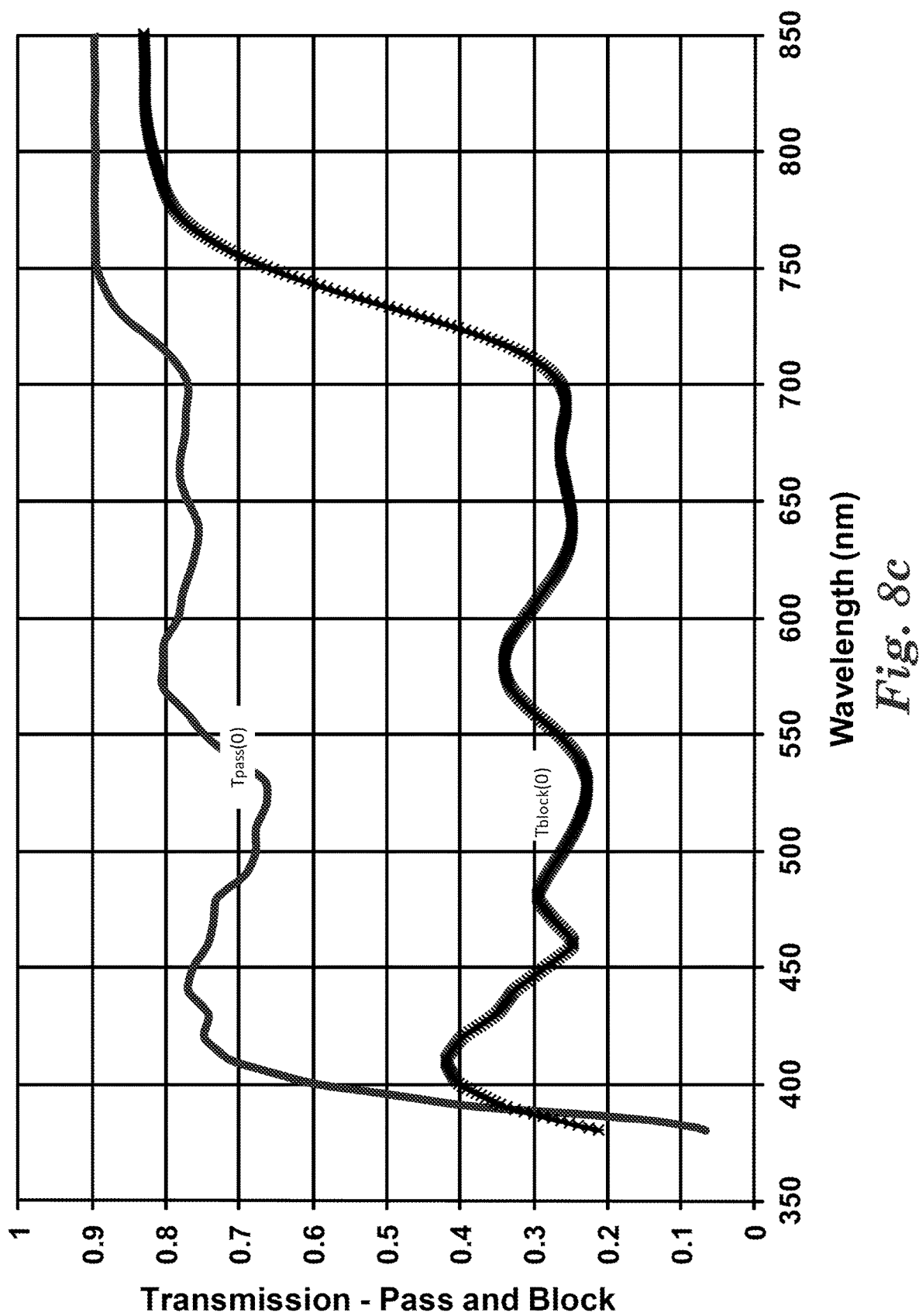

FIG. 8c shows the transmission spectra for element 108 of FIG. 4, where the absorbing polarizer layers 108 and 104 were formed in conjunction with the first reflective polarizer and the second collimating reflective polarizer described above and illustrated in FIGS. 8a and 8b. The absorbing polarizer layers were formed using the process described above, and were separated from the ARCP in order for the spectra $T^{block}(0,\lambda)$ and $T^{pass}(0,\lambda)$ to be measured and subsequently be computed, by fitting the absorption constants of the dichroic dyes, to match the spectral data. The dichroic ratio for the dyes in this example had an average value across the visible spectrum of about 6.5, and showed a slightly positive slope for $T^{pass}(0,\lambda)$ and a neutral slope for $T^{block}(0,\lambda)$.

Figure 8D:
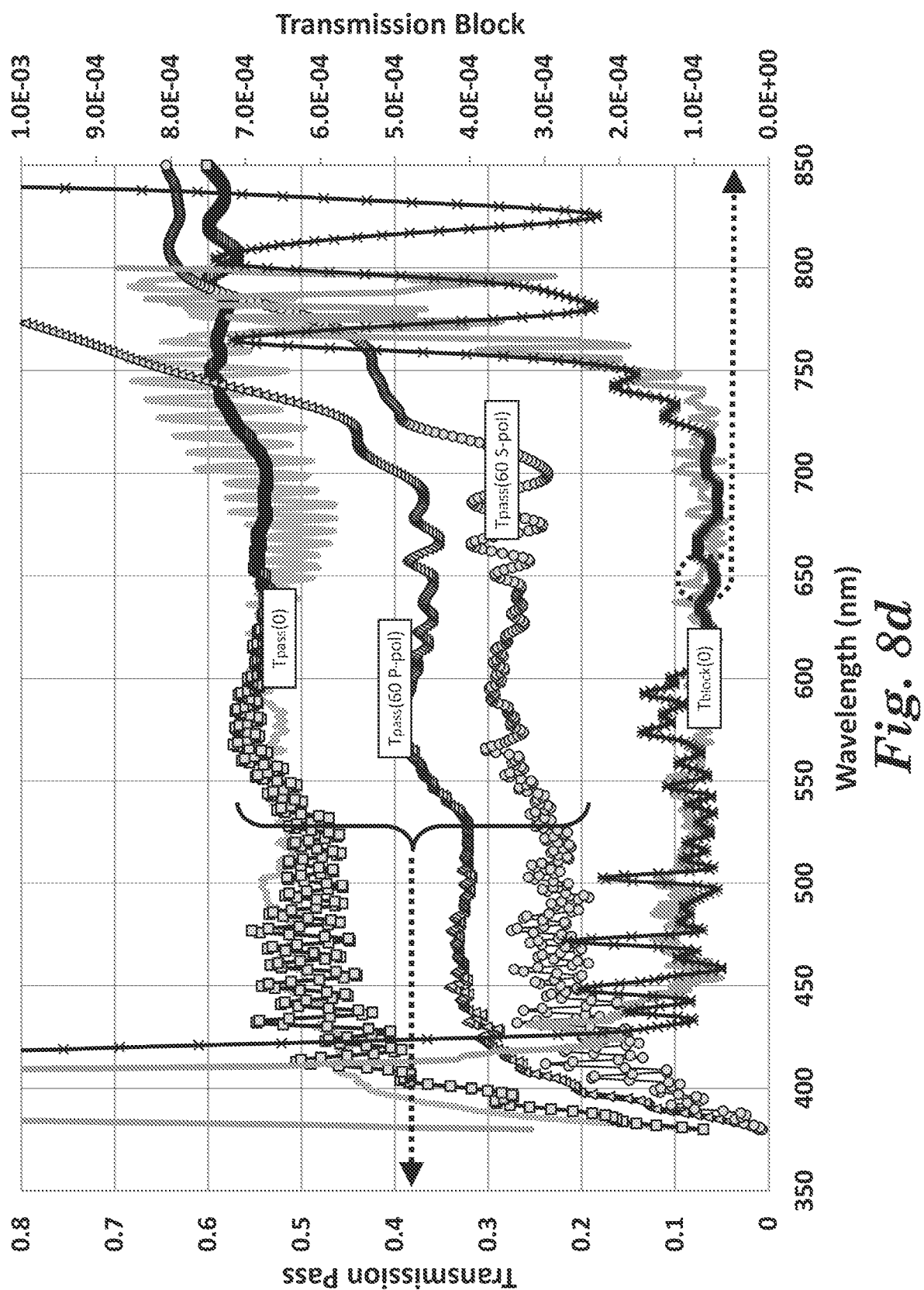

FIG. 8d, shows the measured and computed transmission spectra for the overall ARCP of FIG. 4, where the absorbing polarizer layer 104 was disposed between the first and second reflective polarizers, and 108 was adjacent to the first reflective polarizer.

FIG. 8d shows good agreement between the measured and the computed spectra $T^{block}(0,\lambda)$ and $T^{pass}(0,\lambda)$, and it can be seen that the transmission for $T^{block}(0,\lambda)$ was both very low, approximate $10^{-4}$ across the visible wavelength band, and was substantially neutral. At the same time, the level of collimation and the level of block transmission provided by the ARCP are shown in Table 5, where visible averages are used for the collimation metrics.

TABLE 5

| $T^{pass}(60\ \text{p-pol})/$ $T^{pass}(0)$ | $T^{pass}(60\ \text{s-pol})/$ $T^{pass}(0)$ | $T^{block}(0)$ |
|---|---|---|
| 0.672 | 0.486 | 1.04e−04 |

Figure 9:
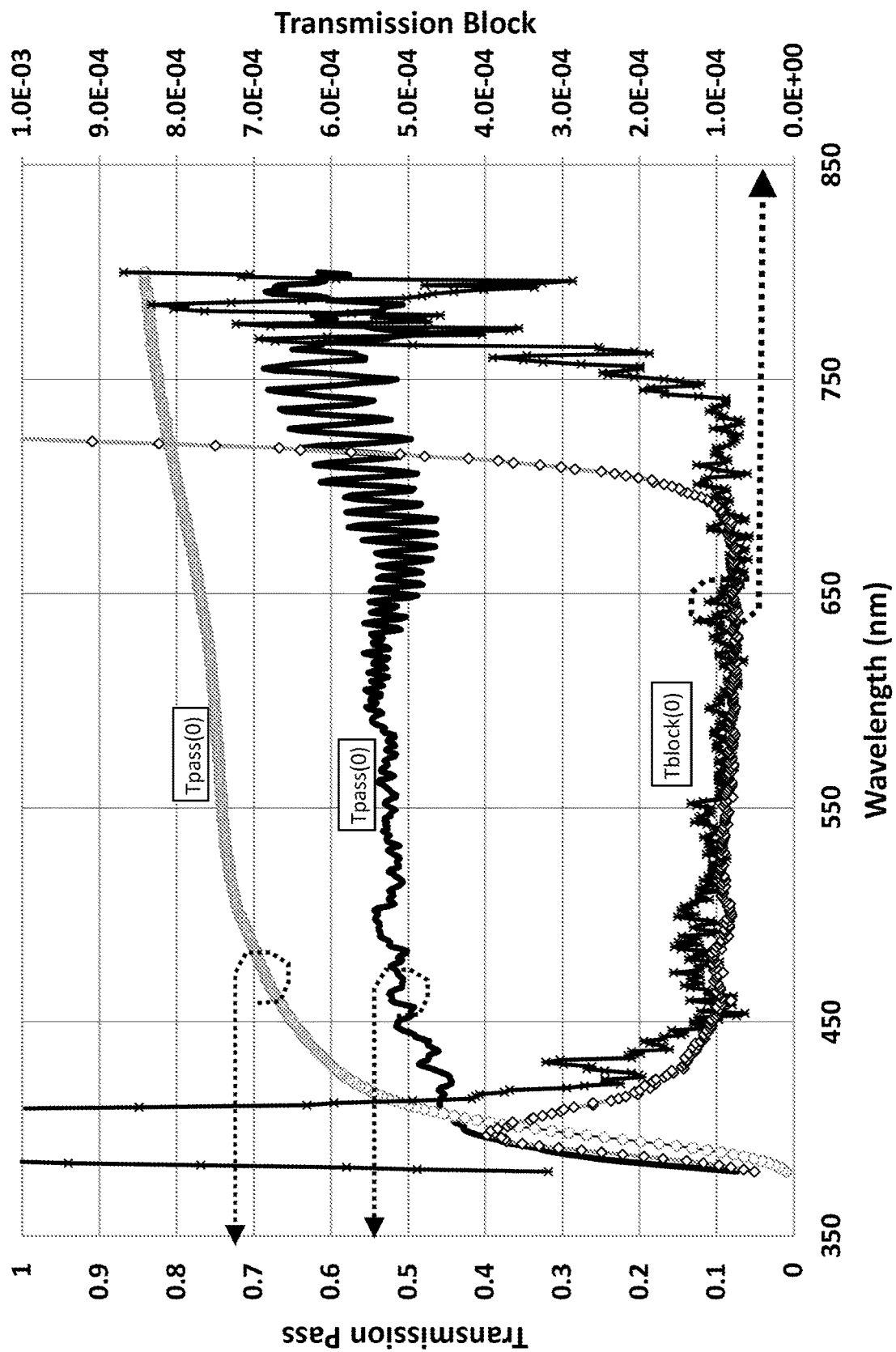
FIG. 9 illustrates transmission spectra of an ARCP of the present description versus a standard absorbing polarizer.

A direct comparison of the measured $T^{block}(0,\lambda)$ and $T^{pass}(0,\lambda)$ spectra for the fabricated ARCP, and a standard absorbing display polarizer, 732 of FIG. 7, is shown in FIG. 9. The curves annotated with symbols are for the standard absorbing display polarizer, in this instance a Sanritz 5618, and the solid lines show $T^{block}(0,\lambda)$ and $T^{pass}(0,\lambda)$ spectra for the fabricated ARCP of this example.

Using the backlight relationships discussed above, we then calculated the backlight intensity spectra, using the spectra of $R_{BL}(\lambda)$, $R^f_{hemi}(\lambda)$, $T^{pass}(\Omega, \lambda)$ and $T^{block}(\Omega, \lambda)$. We next analyzed the backlight Pass Intensity Spectra and backlight Block Intensity Spectra, in order to determine color outcome in both the white state and the dark state, and the ratio of the two. For this example, we took $R_{BL}(\lambda)$ to be constant with wavelength, and had a value of 0.87.

Figure 10:
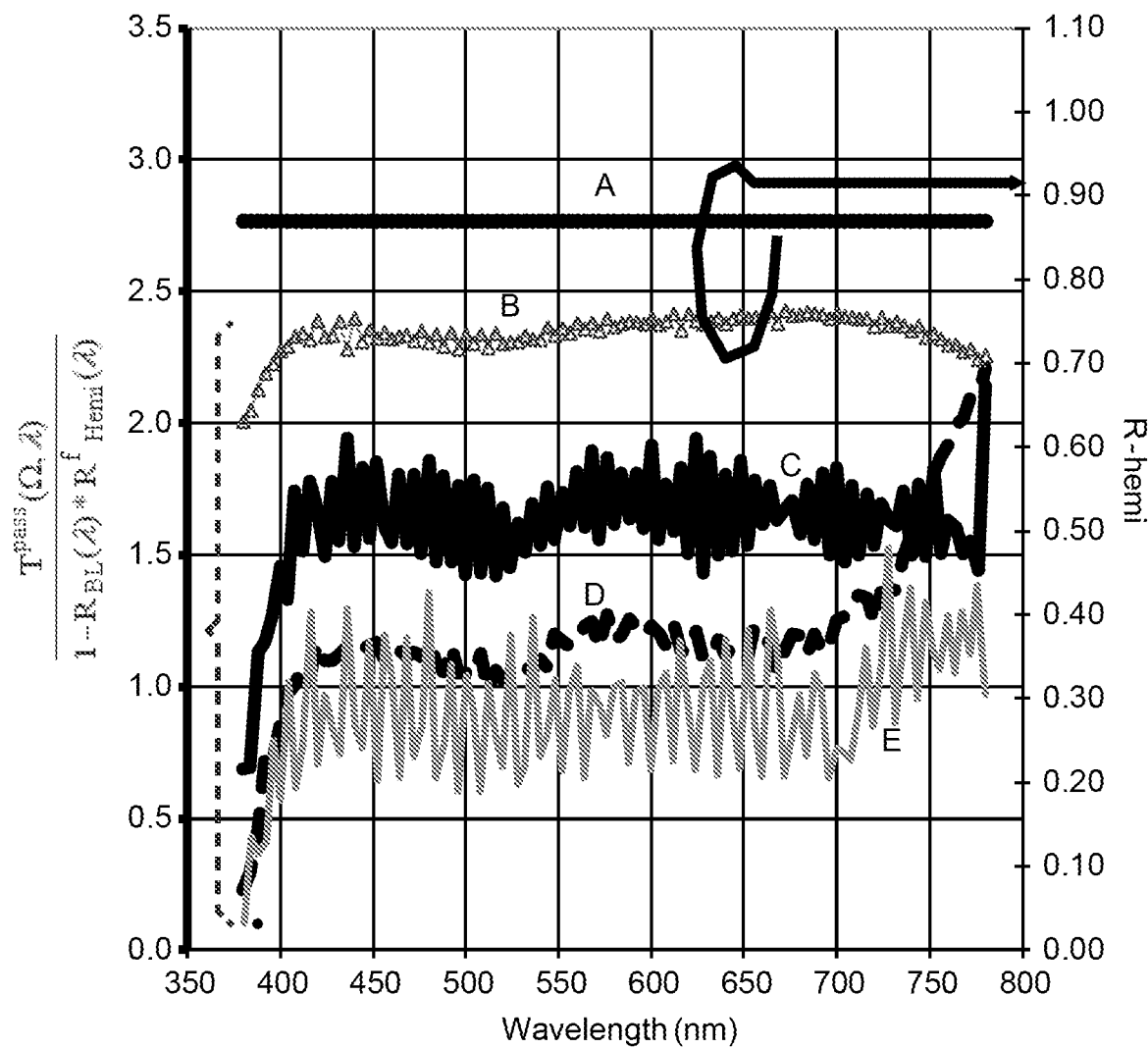
FIG. 10 illustrates the spectra of $R_{BL}(\lambda)$ for a backlight reflector and of ARCP $R^f_{hemi}(\lambda)$ as well as pass intensity spectra.

FIG. 10 shows the spectra of $R_{BL}(\lambda)$ (curve A) for the backlight back reflector, and of the example ARCP $R^f_{hemi}(\lambda)$ (curve B). Also plotted are backlight Pass Intensity spectra, calculated for the view angles 0 degrees (curve C), 60 degrees for p-polarized light propagating in the plane of incidence 122 of FIG. 2 (curve D), and 60 degrees for s-polarized light propagating in the plane of incidence 132 of 22 FIG. 2 (curve E).

Figure 11A:
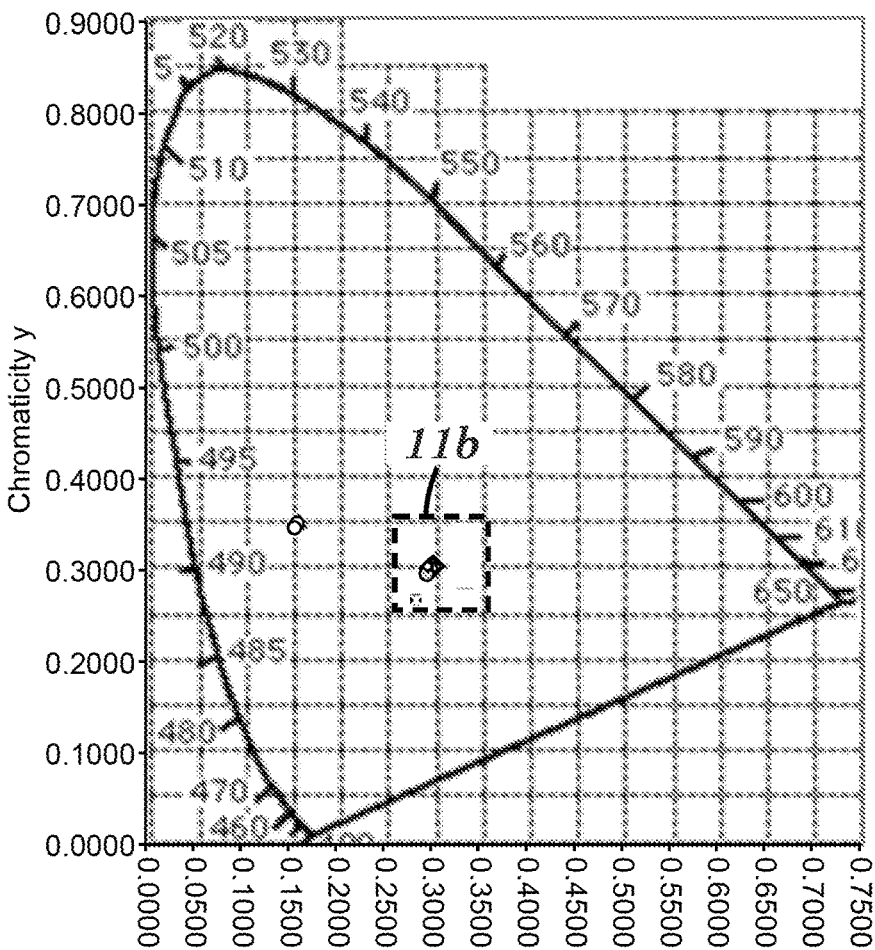
FIGS. 11a-b illustrate chromacity data for light emitted from a backlight with an ARCP front reflector.
Figure 11B:
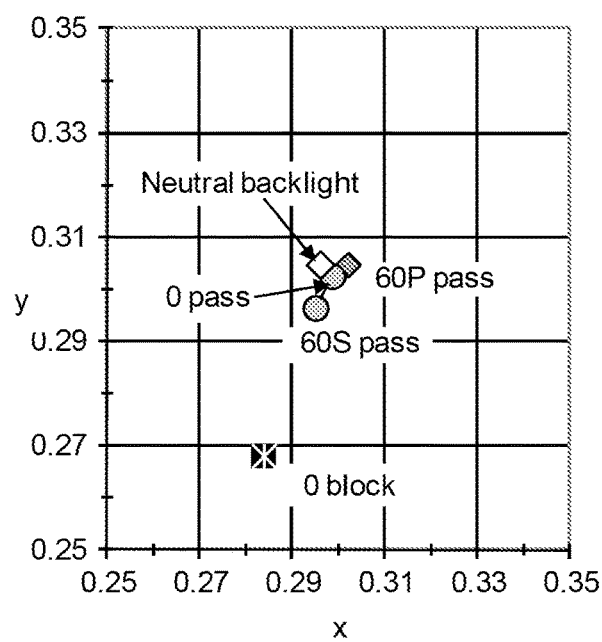

Finally, the backlight system of this example, with the ARCP front reflector was analyzed for backlight emitted color, at the 0 degree and at the positive and negative 60 degree view angles, for each of the p-polarized and s-polarized pass axes (labeled 60S and 60P). The chromaticity data for backlight Pass and Block Intensity Spectra are shown in FIGS. 11a and 11b.

The pass state color for this example was very near the neutral backlight color (determined by the LED spectrum and the color filters in the LC panel) for both the normal-angle view, and for oblique angle views. At the same time, the block state color at normal angle was also near the neutral color point, indicating that the display black pixel regions did not have a colored tint but would appear neutral black. The block state color coordinates differed from the backlight neutral color point by no more than 0.035 for the y deviation, and 0.012 for the x deviation. These levels of x and y chromaticity deviation would be deemed neutral by those skilled in the art. In addition, the deviation of the block state color coordinates from the neutral backlight color coordinate was along the black-body temperature line, which runs through the (0.3, 0.3) chromaticity coordinate, from the upper right to the lower left.

The ratio of the visible-average pass Intensity Spectrum to the visible-average Block Intensity Spectrum was about 4000:1 in this instance.

Example 2b

A second ARCP was generated, in which both the first and the second reflective polarizer were configured in the same manner as Example 2a above; each had the same spectral properties of a ∼−80% slope for the $T^{block}(0, \lambda)$, and each had the same spectral properties of ∼−5% slope for $T^{pass}(0, \lambda)$. The slopes for the first and second reflective polarizers for this ARCP were tabulated in Table 6.

TABLE 6

|  | $T^{pass}(0, \lambda)$ 1st Refl Pol Computed | $T^{block}(0, \lambda)$ 1st Refl Pol Computed | $T^{pass}(0, \lambda)$ 2nd Refl Pol Computed | $T^{block}(0, \lambda)$ 2nd Refl Pol Computed |
|---|---|---|---|---|
| slope | −9% | −88% | −9% | −88% |

Figure 12:
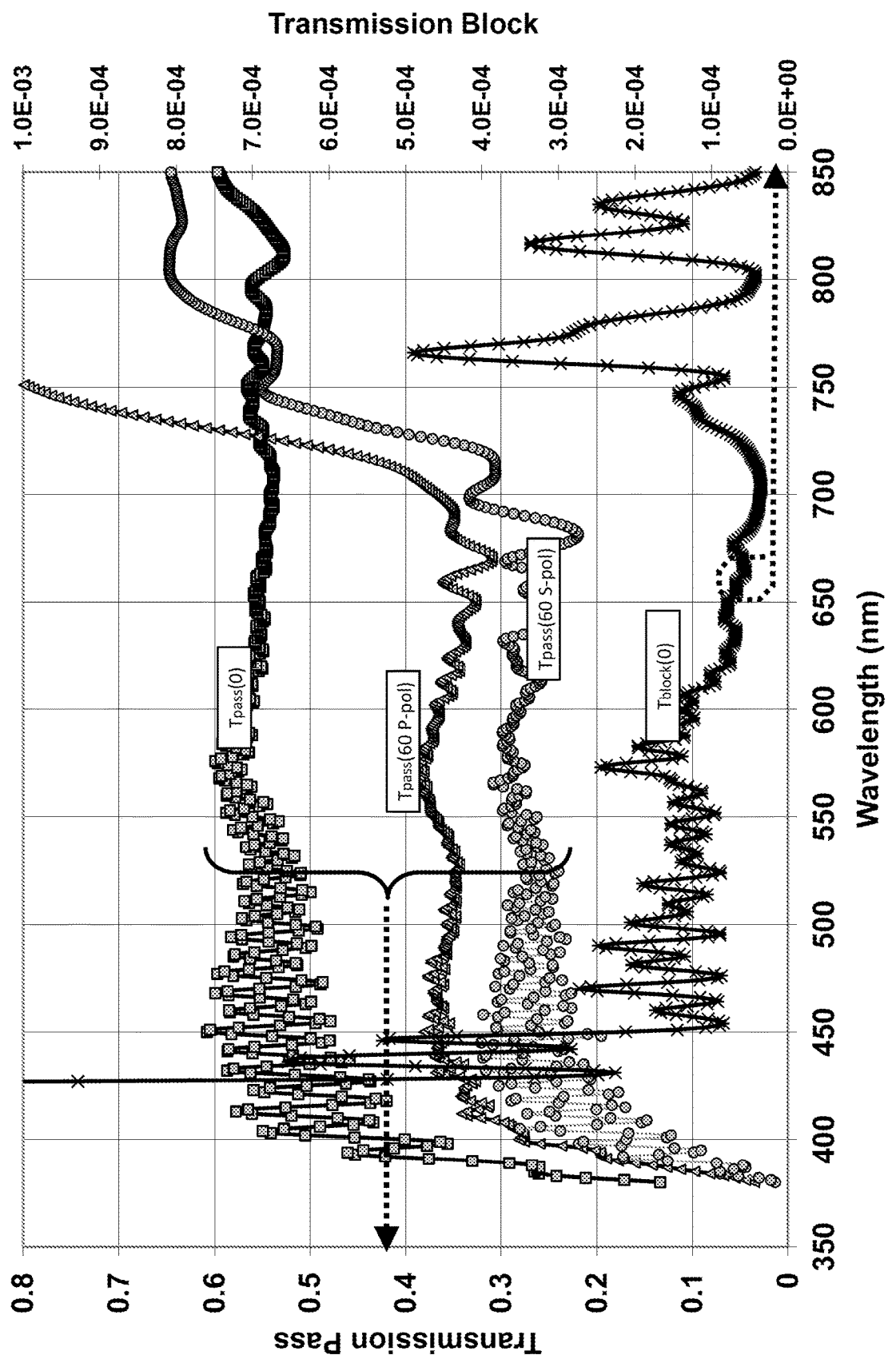
FIG. 12 illustrates the computed transmission spectra for an ARCP according to the present description.

FIG. 12 shows the computed transmission spectra for the overall ARCP of this example 2b, in the configuration of FIG. 4, where the absorbing polarizer layer 104 was disposed between the first and second reflective polarizers, and 108 was adjacent to the first reflective polarizer. The absorbing polarizer layers 104 and 108 were the same as those provided in Example 2a.

It can be seen from FIG. 12 that the transmission spectrum for $T^{block}(0,\lambda)$ was very low (approximate $10^{-4}$ across the visible wavelength band) but was substantially negatively sloped, with higher transmission in the blue spectrum and lower transmission in the red and near-IR. At the same time, the level of collimation and the level of block transmission provided by the ARCP are shown in Table 7, where the visible averages were used for the collimation metrics.

TABLE 7

| $T^{pass}(60\text{ p-pol})/$ $T^{pass}(0)$ | $T^{pass}(60\text{ s-pol})/$ $T^{pass}(0)$ | $T^{block}(0)$ |
|---|---|---|
| 0.650 | 0.495 | 1.33e−04 |

Again, using the backlight relationship discussed above, we calculated the backlight intensity spectra, using the spectra of $R_{BL}(\lambda)$, $R^f_{hemi}(\lambda)$, $T^{pass}(\Omega, \lambda)$ and $T^{block}(\Omega, \lambda)$. We then analyzed the backlight Pass Intensity Spectra and backlight Block Intensity Spectra, in order to determine color outcome in both the white state and the dark state, and the ratio of the two. For this example, we took $R_{BL}(\lambda)$ to be constant with wavelength, and have a value of 0.87.

Figure 13:
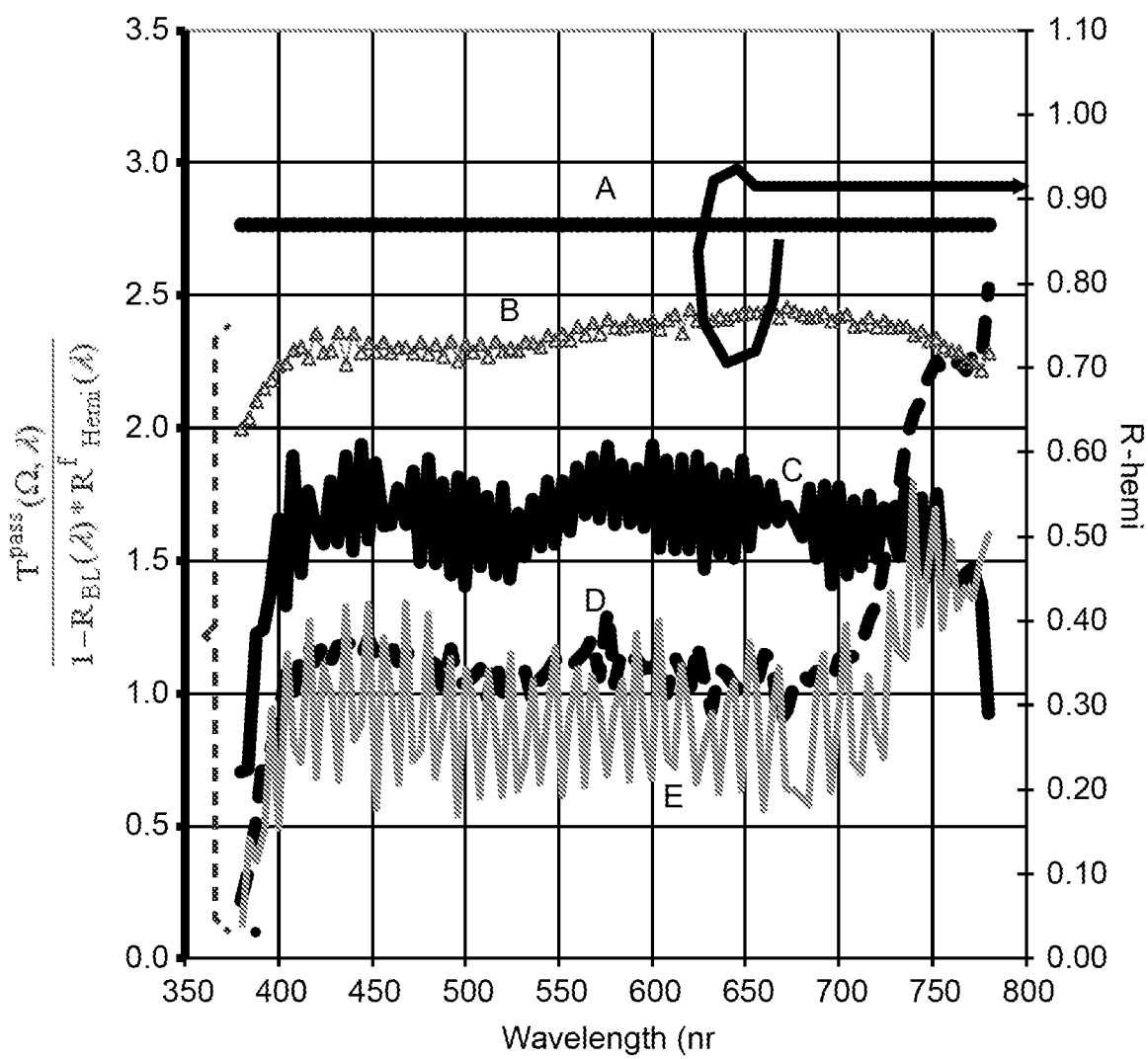
FIG. 13 illustrates the spectra of $R_{BL}(\lambda)$ for a backlight reflector and of ARCP $R^f_{hemi}(\lambda)$ as well as pass intensity spectra.

FIG. 13 shows the spectra of $R_{BL}(\lambda)$ (curve A) for the backlight back reflector, and of the Example 2b ARCP $R^f_{hemi}(\lambda)$ (curve B). Also plotted are backlight Pass Intensity Spectra, calculated for the view angles 0 degrees (curve C), 60 degrees for p-polarized light propagating in the plane of incidence 122 of FIG. 2 (curve D), and 60 degrees for s-polarized light propagating in the plane of incidence 132 of 22 FIG. 2 (curve E).

Figure 14A:
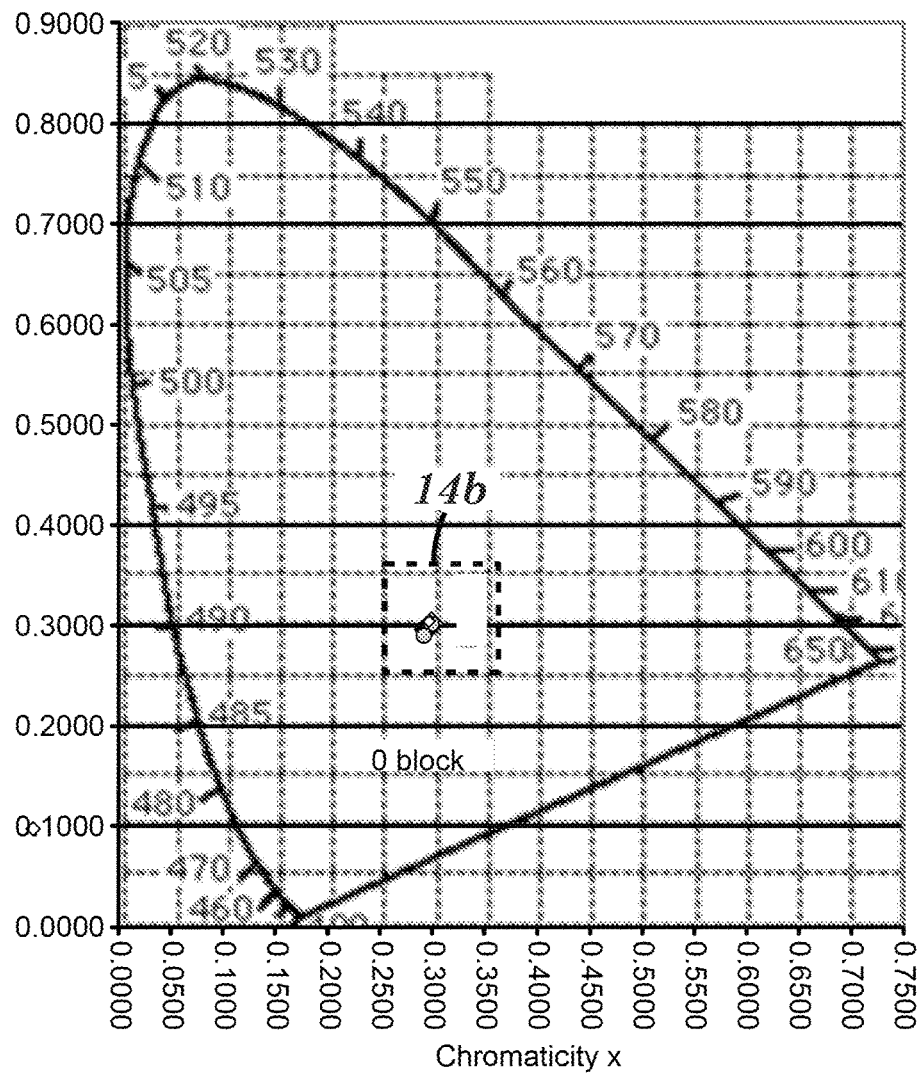
FIGS. 14a-b illustrate chromacity data for light emitted from a backlight with an ARCP front reflector.
Figure 14B:
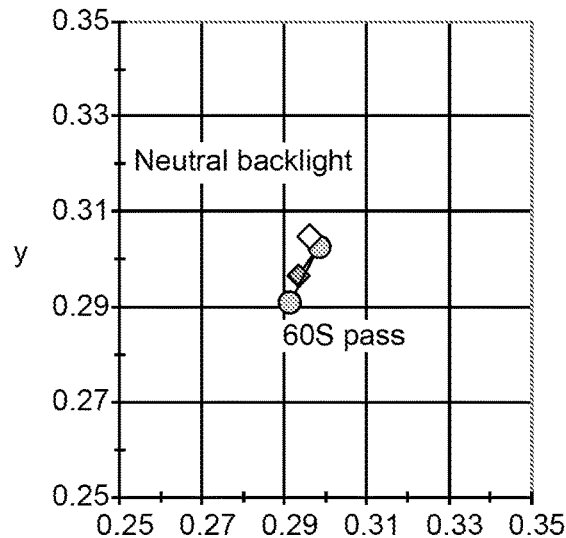

FIGS. 14a and 14b show the backlight system color response of this Example 2b, at the 0 degree and at the positive and negative 60 degree view angles, for each of the p-polarized and s-polarized pass axes (labeled 60S and 60P).

The pass state color for this Example 2b was again very near the neutral backlight color for both the normal-angle view, and for oblique angle views. However, for this Example 2b, the block state color at normal angle was far from the neutral color point, indicating that the display black pixel regions would appear a bluish hue. The block state color coordinates differed from the backlight neutral color point, by 0.178, for the y deviation and 0.225, for the x deviation. These levels of x and y chromaticity deviation were deemed non-neutral, and unacceptable for a backlight and LC Display.

The ratio of the visible-average pass Intensity Spectrum to the visible-average Block Intensity Spectrum was about 2600:1 in this instance.

Example 2c

A third ARCP was generated, in which both the first and the second reflective polarizer were configured in the same manner as Example 2a above; each had the same spectral properties of a ~−80% slope for the $T^{block}(0, \lambda)$, and each had the same spectral properties of ~−5% slope for $T^{pass}(0, \lambda)$. The slopes for the first and second reflective polarizers for this ARCP, were tabulated in Table 8.

TABLE 8

| | $T^{pass}(0, \lambda)$ 1st Refl Pol Computed | $T^{block}(0, \lambda)$ 1st Refl Pol Computed | $T^{pass}(0, \lambda)$ 2nd Refl Pol Computed | $T^{block}(0, \lambda)$ 2nd Refl Pol Computed |
|---|---|---|---|---|
| slope | −1% | 59% | −1% | 59% |

Figure 15:
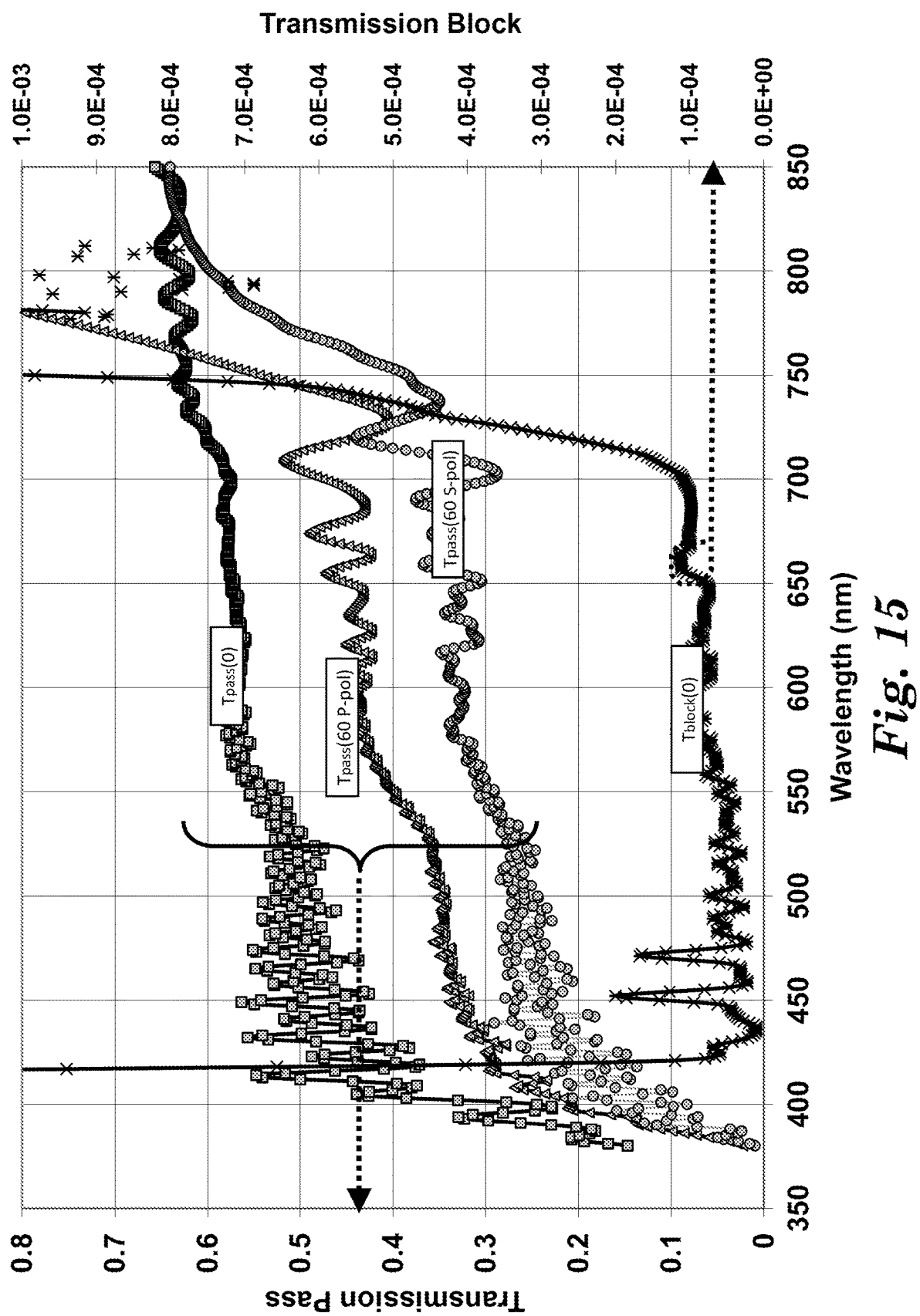
FIG. 15 illustrates the computed transmission spectra for an ARCP according to the present description.

FIG. 15 shows the computed transmission spectra for the overall ARCP of this example 2c, in the configuration of FIG. 4, where the absorbing polarizer layer 104 was disposed between the first and second reflective polarizers, and 108 was adjacent to the first reflective polarizer. The absorbing polarizer layers 104 and 108 were the same as those provided in Example 2a.

It can be seen from FIG. 15, that the transmission spectrum for $T^{block}(0,\lambda)$ was very low, less than $10^{-4}$ across the visible wavelength band, but was substantially positively sloped, with lower transmission in the blue spectrum and higher transmission in the red and near-IR. At the same time, the level of collimation and the level of block transmission provided by the ARCP are shown in Table 9, where visible averages were used for the collimation metrics.

TABLE 9

| $T^{pass}(60\text{ p-pol})/$ $T^{pass}(0)$ | $T^{pass}(60\text{ s-pol})/$ $T^{pass}(0)$ | $T^{block}(0)$ |
|---|---|---|
| 0.734 | 0.547 | 6.89e−05 |

Again, using the backlight relationships discussed above, we calculated the backlight intensity spectra, using the spectra of $R_{BL}(\lambda)$, $R^f_{hemi}(\lambda)$, $T^{pass}(\Omega, \lambda)$ and $T^{block}(\Omega, \lambda)$, and then analyzed the backlight Pass Intensity Spectra and backlight Block Intensity Spectra, in order to determine color outcome in both the white state and the dark state, and the ratio of the two. For this example, we again took $R_{BL}(\lambda)$ to be constant with wavelength, and have a value of 0.87.

Figure 16:
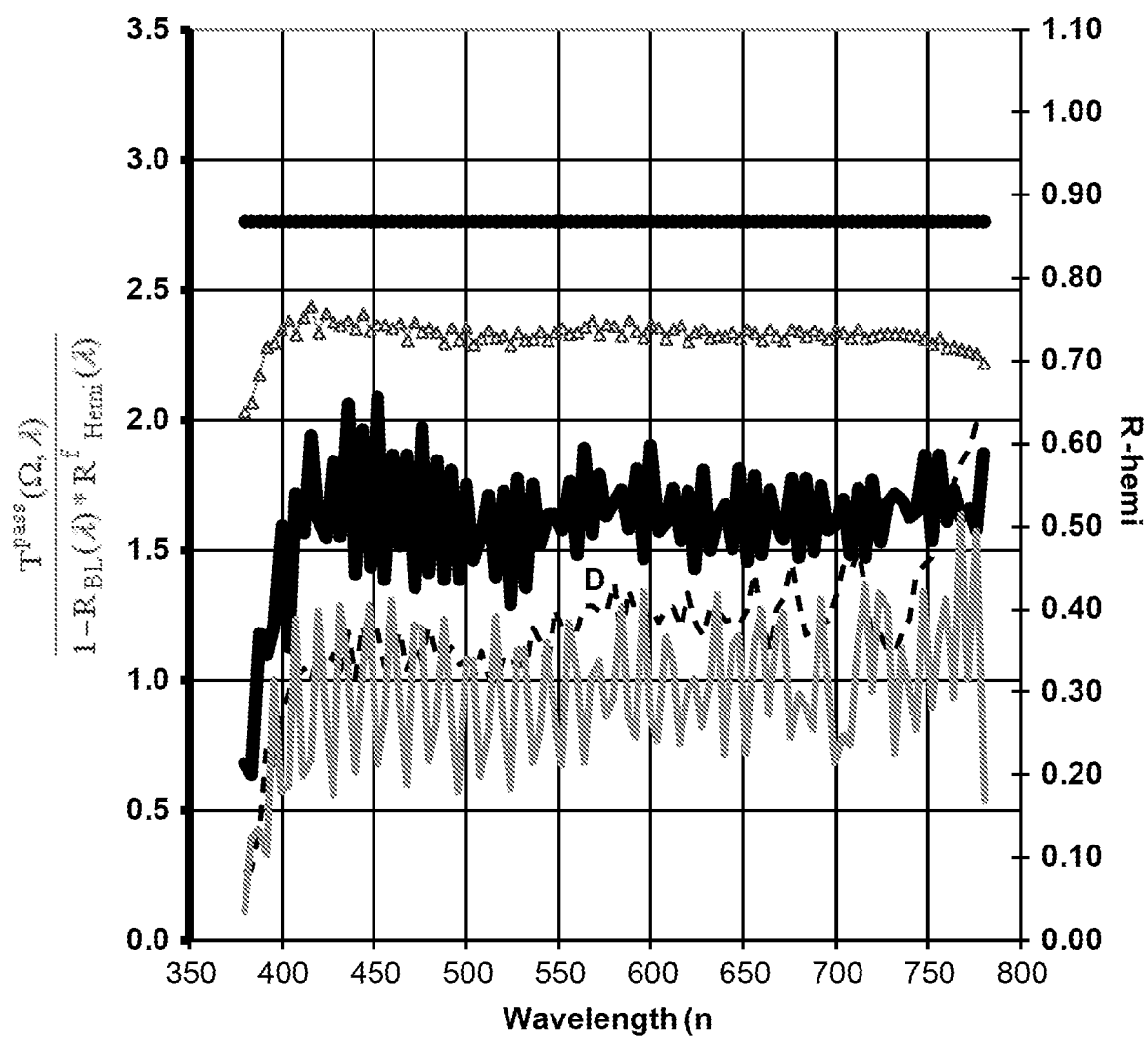
FIG. 16 illustrates the spectra of $R_{BL}(\lambda)$ for a backlight reflector and of ARCP $R^f_{hemi}(\lambda)$ as well as pass intensity spectra.

FIG. 16 shows the spectra of $R_{BL}(\lambda)$ (curve A) for the backlight back reflector, and of the Example 2c ARCP $R^f_{hemi}(\lambda)$ (curve B). Also plotted are backlight Pass Intensity Spectra, calculated for the view angles 0 degrees (curve C), 60 degrees for p-polarized light propagating in the plane of incidence 122 of FIG. 2 (curve D), and 60 degrees for s-polarized light propagating in the plane of incidence 132 of 22 FIG. 2 (curve E).

Figures 17A, 17B:
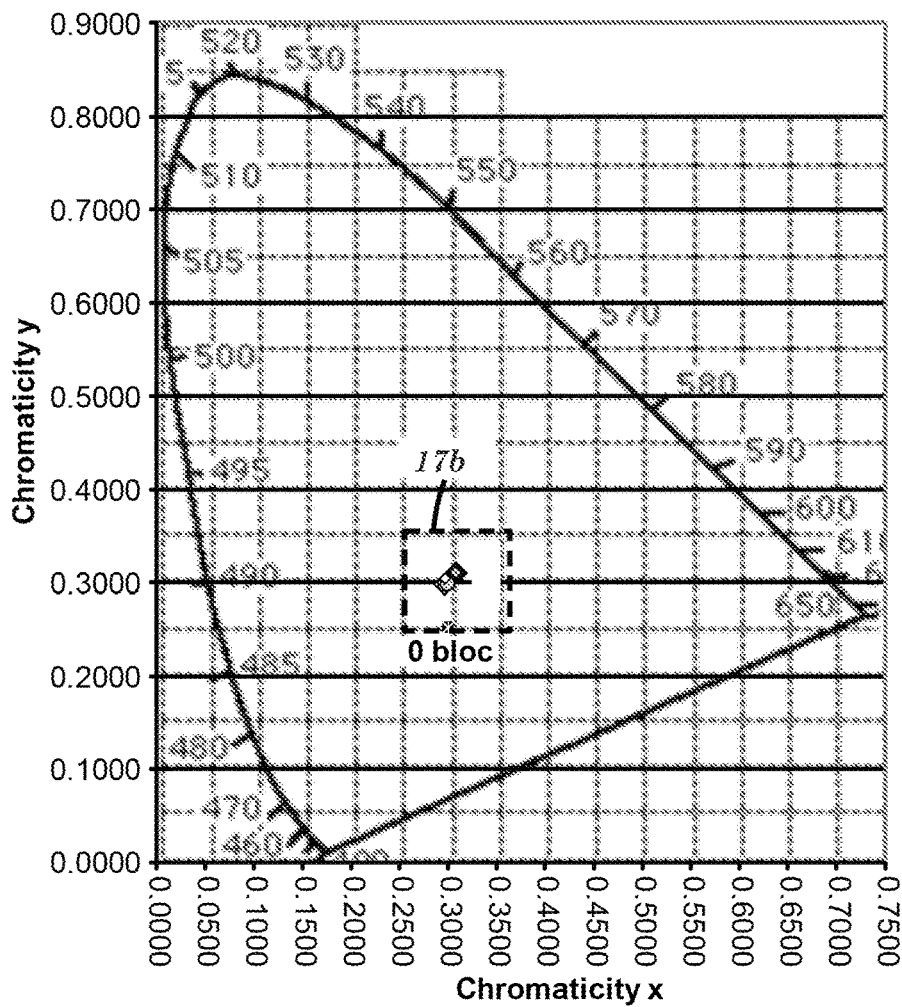
FIGS. 17a-b illustrate chromacity data for light emitted from a backlight with an ARCP front reflector.

FIGS. 17a and 17b shows the backlight system color response of this Example 2c, at the 0 degree and at the positive and negative 60 degree view angles, for each of the p-polarized and s-polarized pass axes (labeled 60S and 60P).

The pass state color for this example 2c was again very near the neutral backlight color for both the normal-angle view, and for oblique angle views. However, for this example 2c, the block state color at normal angle was removed from the neutral color point towards a magenta, indicating that the display black pixel regions would appear as a magenta hue. The block state color coordinates differed from the backlight neutral color point, by 0.052 for the y deviation, and −0.003 for the x deviation. These levels of x and y chromaticity deviation were deemed non-neutral (deviation of the radial distance for the backlight neutral point is greater than 0.025), and unacceptable for a backlight and LC Display.

In addition, the deviation of the block state color coordinates from the neutral backlight color coordinate, ran nearly perpendicular to the black-body temperature line, which runs through the (0.3, 0.3) chromaticity coordinate, from the upper right to the lower left. Perpendicular chromaticity coordinate deviations from the black-body temperature line, are known to be significantly more perceptible as a color deviation, than those that run parallel, or along the Blackbody color temperature line, such as is that case for Example 2a.

The ratio of the visible-average pass Intensity Spectrum to the visible-average Block Intensity Spectrum was about 9400:1 in this instance.

The present invention should not be considered limited to the particular examples and embodiments described above, as such embodiments are described in detail in order to facilitate explanation of various aspects of the invention. Rather, the present invention should be understood to cover all aspects of the invention, including various modifications, equivalent processes, and alternative devices falling within the scope of the invention as defined by the appended claims.

The following are exemplary embodiments according to the present disclosure:

Item 1. A polarizer stack comprising: a first birefringent reflective polarizer having pass and block axis transmission spectra, a collimating birefringent reflective polarizer having a block axis transmittance that decreases with increasing wavelength, and an absorbing polarizer layer positioned between the first birefringent reflective polarizer and collimating birefringent reflective polarizer, wherein the pass axis transmission of the polarizer stack as a whole is substantially neutral across the visible wavelength band.

Item 2. The polarizer stack of item 1, wherein the block axis transmittance of the first birefringent reflective polarizer increases as wavelength increases across the visible spectrum.

Item 3. The polarizer stack of item 1, wherein the pass axis transmittance of the collimating birefringent reflective polarizer is neutral or decreases as wavelength increases across the visible spectrum.

Item 4. The polarizer stack of item 1, wherein the polarizer stack satisfies: $T^{pass}60/T^{pass}0<0.75$ for p-pol light.

Item 5. The polarizer stack of item 4, wherein the polarizer stack satisfies: $T^{pass}60/T^{pass}0<0.60$ for p-pol light.

Item 6. The polarizer stack of item 4 or 5, wherein the polarizer stack satisfies: $T^{block}0<10^{-3}$.

Item 7. The polarizer stack of item 1, wherein $T^{pass}$ of visible light is greater than 0.3.

Item 8. The polarizer stack of item 1, wherein $T^{pass}$ of visible light is greater than 0.4.

Item 9. The polarizer stack of item 1, wherein $T^{pass}$ of visible light is greater than 0.5.

Item 10. The polarizer stack of item 1, wherein the polarizer stack satisfies: $T^{pass}60/T^{pass}0<0.75$ for s-pol light and wherein the polarizer stack satisfies: $T^{block}0<10^{-3}$.

Item 11. The polarizer stack of item 6, wherein the polarizer stack satisfies: $T^{pass}60/T^{pass}0<0.60$ for s-pol light.

Item 12. The polarizer stack of item 7 or 8, wherein the polarizer stack satisfies: $T^{block}0<10^{-3}$.

Item 13. The polarizer stack of item 1, wherein the contrast ratio of the absorbing polarizer layer is 100:1 or less.

Item 14. The polarizer stack of item 1, wherein the contrast ratio of the polarizer stack is 6,000:1 or more.

Item 15. The polarizer stack of item 1, wherein the $R_{hemi}$ of first birefringent reflective polarizer is <0.50, and the $R_{hemi}$ of the collimating birefringent reflective polarizer is at least 0.60

Item 16. The polarizer stack of item 1, further comprising a second absorbing polarizer layer positioned on the opposite side of the first birefringent polarizer from the absorbing polarizer layer.

Item 17. A backlight, comprising a light source and the polarizer stack of item 1.

Item 18. A display comprising a panel and the backlight of item 17.

Item 19. A backlight comprising:
(1) a light recycling cavity, the light cavity comprising: a front reflector, a back reflector, a pass Intensity Spectrum and a Block Intensity Spectrum, wherein the front reflector is partially reflective and comprises an ARCP; and
(2) one or more light source members disposed to emit light into the light recycling cavity;
wherein the pass Intensity Spectrum and Block Intensity Spectrum are both substantially neutral across a visible wavelength band and have the ratio of at least 500:1 at normal incidence.

Item 20. The backlight of item 19, wherein the ARCP comprises a first birefringent reflective polarizer having pass and block axis transmission spectra, a collimating birefringent reflective polarizer having a block axis transmittance that decreases with increasing wavelength, and an absorbing polarizer layer positioned between the first birefringent reflective polarizer and collimating birefringent reflective polarizer.

Item 21. The backlight of item 20, wherein the pass axis transmission of the ARCP is substantially neutral across the visible wavelength band.

Item 22. The backlight of item 21, wherein the pass Intensity Spectrum and Block Intensity Spectrum are both substantially neutral across a visible wavelength band and have the ratio of at least 1,000:1 at normal incidence.

Item 23. The backlight of item 19, wherein the ARCP satisfies: $T^{pass}60/T^{pass}0<0.75$ for p-pol light.

Item 24. The backlight of item 23, wherein the ARCP satisfies: $T^{pass}60/T^{pass}0<0.60$ for p-pol light.

Item 25. The backlight of item 19, wherein the ARCP satisfies: $T^{pass}60/T^{pass}0<0.75$ for s-pol light.

Item 26. The backlight of item 25, wherein the ARCP satisfies: $T^{pass}60/T^{pass}0<0.75$ for s-pol light.

What is claimed is:

1. A polarizer stack comprising: a first birefringent reflective polarizer having pass and block axis transmission spectra, a collimating birefringent reflective polarizer having a block axis transmittance that decreases with increasing wavelength, and an absorbing polarizer layer positioned between the first birefringent reflective polarizer and collimating birefringent reflective polarizer, wherein the pass axis transmission of the polarizer stack as a whole is substantially neutral across the visible wavelength band, wherein the block axis transmittance of the first birefringent reflective polarizer increases as wavelength increases across the visible spectrum, and wherein the pass axis transmittance of the collimating birefringent reflective polarizer is neutral or decreases as wavelength increases across the visible spectrum.

2. The polarizer stack of claim 1, wherein the polarizer stack satisfies: $T^{pass}60/T^{pass}0<0.75$ for p-pol light, wherein $T^{pass}60$ means visible light pass axis transmission at 60 degrees incidence and $T^{pass}0$ means visible light pass axis transmission at normal incidence.

3. The polarizer stack of claim 2, wherein the polarizer stack satisfies: $T^{block}0<10^{-3}$, wherein $T^{block}0$ means visible light block axis transmission at normal incidence.

4. The polarizer stack of claim 1, wherein the polarizer stack satisfies: $T^{pass}60/T^{pass}0<0.75$ for s-pol light and wherein the polarizer stack satisfies: $T^{block}0<10^{-3}$ wherein $T^{pass}60$ means visible light pass axis transmission at 60 degrees incidence, $T^{pass}0$ means visible light pass axis transmission at normal incidence, and $T^{block}0$ means visible light block axis transmission at normal incidence.

5. The polarizer stack of claim 1, wherein the contrast ratio of the absorbing polarizer layer is 100:1 or less.

6. The polarizer stack of claim 1, further comprising a second absorbing polarizer layer positioned on the opposite side of the first birefringent polarizer from the absorbing polarizer layer.

7. A backlight, comprising a light source and the polarizer stack of claim 1.

* * * * *